United States Patent
Kamimura et al.

(10) Patent No.: US 11,130,467 B2
(45) Date of Patent: Sep. 28, 2021

(54) FABRIC FOR AIRBAG, COATED FABRIC FOR AIRBAG, AND AIRBAG USING SAME

(71) Applicant: TOYOBO CO., LTD., Osaka (JP)

(72) Inventors: Ryuji Kamimura, Otsu (JP); Tsutomu Akechi, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/640,552

(22) PCT Filed: Aug. 17, 2018

(86) PCT No.: PCT/JP2018/030500
§ 371 (c)(1),
(2) Date: Feb. 20, 2020

(87) PCT Pub. No.: WO2019/039396
PCT Pub. Date: Feb. 28, 2019

(65) Prior Publication Data
US 2020/0353889 A1    Nov. 12, 2020

(30) Foreign Application Priority Data

Aug. 21, 2017  (JP) .............................. JP2017-158716
Mar. 29, 2018  (JP) .............................. JP2018-064260

(51) Int. Cl.
*B60R 21/235* (2006.01)
*D03D 1/02* (2006.01)
*D06M 10/04* (2006.01)
*D06M 15/643* (2006.01)

(52) U.S. Cl.
CPC ............ *B60R 21/235* (2013.01); *D03D 1/02* (2013.01); *D06M 10/04* (2013.01); *D06M 15/643* (2013.01)

(58) Field of Classification Search
CPC ..... D03D 1/02; B60R 21/235; D06M 15/643; D06M 10/00
See application file for complete search history.

(56) References Cited

U.S. PATENT DOCUMENTS

| | | | | |
|---|---|---|---|---|
| 3,539,663 A  * | 11/1970 | Prevorsek | ............ | D01D 5/423 428/364 |
| 4,921,735 A | 5/1990 | Bloch | | |
| 5,581,856 A | 12/1996 | Krummheuer et al. | | |
| 8,261,779 B2 * | 9/2012 | Horiguchi | ............ | D02G 3/446 139/387 R |
| 9,012,340 B2 * | 4/2015 | Fujiyama | ............ | B60R 21/235 442/189 |
| 10,562,483 B2 * | 2/2020 | Hosaka | ............ | D03D 1/02 |
| 2005/0089654 A1 * | 4/2005 | Yu | ............ | D03D 1/02 428/34.1 |
| 2005/0142969 A1 * | 6/2005 | Yu | ............ | D01F 6/60 442/181 |
| 2009/0247030 A1 * | 10/2009 | Kano | ............ | D06M 15/53 442/104 |
| 2010/0048079 A1 * | 2/2010 | Fujiyama | ............ | D03D 15/0088 442/189 |
| 2010/0260976 A1 * | 10/2010 | Kano | ............ | D03D 15/0088 428/172 |
| 2011/0020628 A1 * | 1/2011 | Fukudome | ............ | C08G 69/28 428/221 |
| 2011/0036447 A1 * | 2/2011 | Horiguchi | ............ | D02G 3/446 139/383 R |
| 2011/0097955 A1 | 4/2011 | Kano et al. | | |
| 2012/0225229 A1 | 9/2012 | Ise | | |
| 2013/0147170 A1 * | 6/2013 | Tanaka | ............ | B60R 21/235 280/743.1 |
| 2014/0302263 A1 | 10/2014 | Ise et al. | | |
| 2015/0336530 A1 * | 11/2015 | Tanaka | ............ | D03D 1/02 280/728.1 |
| 2017/0136982 A1 | 5/2017 | Akechi | | |

FOREIGN PATENT DOCUMENTS

| | | |
|---|---|---|
| CN | 101479414 | 7/2009 |
| CN | 101864634 | 10/2010 |
| CN | 101883890 | 11/2010 |
| CN | 102046859 | 5/2011 |
| CN | 102140719 | 8/2011 |
| CN | 102471954 | 5/2012 |
| CN | 102535182 | 7/2012 |
| CN | 103906867 | 7/2014 |
| CN | 106029452 | 10/2016 |
| CN | 106319720 | 1/2017 |
| CN | 106835329 | 6/2017 |
| EP | 0314867 | 5/1989 |
| EP | 0436950 | 7/1991 |
| EP | 1365059 | 11/2003 |
| EP | 2256237 | 12/2010 |
| JP | 2005-138704 | 6/2005 |
| JP | 2010-106375 | 5/2010 |
| JP | 2011-202340 | 10/2011 |
| JP | 2013-189744 | 9/2013 |
| JP | 5335369 | 11/2013 |
| WO | 2009/084334 | 7/2009 |
| WO | 2011/055562 | 5/2011 |
| WO | 2013/084326 | 6/2013 |

OTHER PUBLICATIONS

Japan Patent Office, International Search Report for PCT/JP2018/030500 dated Oct. 16, 2018 with English translation.
Office action issued in Chinese Appln. No. 201880054610.6, dated Sep. 2, 2020, 15 pages, with English Machine Translation.
EPO Communication with Extended European Search Report and Search Opinion in European Appln. No. 18848067.7, dated May 11, 2021, 9 pages.

* cited by examiner

*Primary Examiner* — Arti Singh-Pandey
(74) *Attorney, Agent, or Firm* — Fish & Richardson P.C.

(57) ABSTRACT

An airbag fabric comprising a synthetic fiber, the fiber having a total fineness of 200 to 400 dtex, and the fabric having an average edgecomb resistance retention in the warp and weft directions after heating at 210° C. for 30 seconds of 60% or more and a residual shrinkage of 1.5% or less in both the warp and weft directions.

10 Claims, 2 Drawing Sheets

FABRIC FOR AIRBAG, COATED FABRIC FOR AIRBAG, AND AIRBAG USING SAME

TECHNICAL FIELD

The present invention relates to an airbag fabric and a coated fabric for airbags, which are automotive safety components. More specifically, the present invention relates to an airbag fabric and a coated fabric for airbags that are lightweight and compact, while maintaining the tensile strength required for airbags; that can mitigate damage to seams of airbags during deployment; and that allow for stable airbag deployment.

BACKGROUND ART

The demand for a lightweight and compact airbag module system has been growing in recent years because of the need for development to improve the interior space design of vehicles; enhance the visibility of various indicators from the driver's seat; downsize vehicles, while retaining the inside space thereof; and increase fuel efficiency during driving.

An airbag module system is composed of: an airbag mainly comprising a fabric; and a deployment device called an inflator, which instantly deploys an airbag using accumulated air or an explosive as a starting material. In particular, airbags for frontal collisions, such as airbags for driver's seats and front passenger seats, significantly affect the interior design of vehicles; therefore, "gyro-type" inflators, which are lightweight, compact, and low-cost, are used.

Pyro-type inflators, which use gunpowder, have a high gas generation temperature. Therefore, due to hot air, pyro-type inflators tend to significantly damage the fabric used for airbags. In particular, in airbags formed by cutting and sewing, high-temperature gas concentratedly released through holes at seams may melt the holes, and adjacent holes may be connected to each other to problematically form stitch-merging.

If the total fineness of the multifilament yarn used is made thinner or the weave density of fabric used for airbags is lowered to achieve light weight and compactness of airbag fabric so as to meet the above need for development, a problem arises such that when hot air passes through holes at seams, damage per multifilament yarn increases due to a reduced heat capacity per multifilament yarn.

Further, if the total fineness of the multifilament yarn used is made thinner or the weave density of fabric used for airbags is lowered, light weight and compactness are improved; however, tensile strength of the airbag fabric is reduced, and thus the mechanical properties required for airbags to restrain occupants cannot be provided.

Various studies have been conducted to solve such problems entailed in achieving light weight and compactness of airbag fabrics. However, there has been nothing developed thus far that is problem-free.

Patent Literature (PTL) 1 discloses an example in which an airbag fabric processing method is performed under milder conditions to control the thermal stress of fibrillated yarn of an airbag fabric, and thereby reduce air permeability of the base fabric during airbag deployment.

However, PTL 1 does not verify the relationship between thermal stress characteristics and damage to seams. Furthermore, when original yarn having a high boiling-water shrinkage of more than 8.5% is used, the use of mild processing conditions incurs high residual shrinkage; therefore, there remain concerns about long-term stability in terms of configuration and physical properties, and the obtained airbag may not deploy uniformly.

Patent Literature (PTL) 2 discloses that an airbag fabric that is excellent in terms of flexibility, thinness, and light weight, while maintaining mechanical properties, is provided by using high-strength original yarn having a tensile strength of 9.0 cN/dtex or higher, instead of a common nylon yarn tensile strength (8.5 cN/dtex).

In the present invention, it is necessary to weave fabric at a considerably high tension in order to impart yarn slippage resistance to the fabric while suppressing fuzz generation in a weaving step due to "low elongation," which, in principle, inevitably occurs during production when original yarn is strengthened. Accordingly, a feature of the present invention is using a resin having a higher degree of polymerization and a higher viscosity than common resin, to thereby produce original yarn having a tensile elongation of 20% or more; and using the original yarn.

However, the use of high-viscosity resin as a starting material has problems in that application to existing equipment is difficult, and thus lacks versatility; and in that the use of a resin having a high degree of polymerization has poor cost efficiency. Furthermore, even though original yarn having a high tensile elongation is used, it is necessary to weave fabric at a high tension. Therefore, in order to avoid increasing the defect rate, the rotational speed of the loom is set to 500 to 600 rpm, which is a relatively mild rotational speed, and productivity is not taken into consideration.

Furthermore, PTL 2 does not investigate yarn slippage resistance at high temperatures during airbag deployment. In particular, the effects of shrinkage conditions of original yarn and thermal stress on yarn slippage of fabric are not investigated.

CITATION LIST

Patent Literature

PTL 1: JP2011-202340A
PLT 2: JP2013-189744A

SUMMARY OF INVENTION

Technical Problem

An object of the present invention is to provide an airbag fabric and a coated fabric for airbags that can solve the above problems of the prior art, and that are lightweight and compact while maintaining the tensile strength required for airbags; that can mitigate damage to seams of airbags during deployment; and that allow for stable airbag deployment.

Solution to Problem

The present inventors conducted extensive research to solve the above problems, and have finally accomplished the present invention. More specifically, the present invention provides the following.

1. An airbag fabric that is a fabric comprising a synthetic fiber, the fiber that constitutes the fabric having a total fineness of 200 to 400 dtex, an average edgecomb resistance retention in the warp and weft directions after heating at 210° C. for 30 seconds of 60% or more, and a residual shrinkage of 1.5% or less in both the warp and weft directions.

2. The airbag fabric according to the above 1, wherein the fiber that constitutes the fabric has a tensile strength of 7.5 to 9.3 cN/dtex.

3. The airbag fabric according to the above 1 or 2, wherein the fabric has a mass per unit area of 210 g/m² or less, a thickness of 0.3 mm or less, and a tensile strength of 550 N/cm or more.

4. The airbag fabric according to any one of the above 1 to 3, wherein the synthetic fiber comprises a polyamide multifilament comprising a polyamide resin having a relative polymer viscosity to sulfuric acid of 3.0 to 3.5, the multifilament having a tensile strength of 9.0 cN/dtex or more, a tensile elongation of less than 20%, a total fineness of 400 dtex or less, a fineness of single filament of 2 to 7 dtex, a boiling-water shrinkage of 7 to 12%, and a coefficient of variation CV % of single filament cross-sectional diameter of 20% or less.

5. The airbag fabric according to any one of the above 1 to 4, which is produced by, after weaving gray fabric, subjecting the gray fabric to a hot-water shrinkage step using hot water of 80° C. or higher, and to a dry-finishing step.

6. An airbag comprising the airbag fabric according to any one of the above 1 to 5.

7. A coated fabric for airbags that is a fabric comprising a synthetic fiber, the fabric having a coefficient of compactness test of 8000 to 11000 mm³, an average edgecomb resistance retention in the warp and weft directions after heating at 210° C. for 30 seconds of 60% or more, and a residual shrinkage of 1.5% or less in both the warp and weft directions.

8. The coated fabric for airbags according to the above 7, wherein the fabric has a thickness of 0.3 mm or less, and a tensile strength of 550 N/cm or more.

9. The coated fabric for airbags according to the above 7 or 8, comprising a solvent-free silicone as a coating resin.

10. An airbag comprising the coated fabric for airbags according to any one of the above 7 to 9.

Advantageous Effects of Invention

The present invention provides an airbag fabric and a coated fabric for airbags that are lightweight and compact during packing; that have the tensile strength required when the airbag deploys; that can mitigate damage to seams, as compared with conventional fabrics; and that allow for stable airbag deployment.

DESCRIPTION OF EMBODIMENTS

Figure 1:
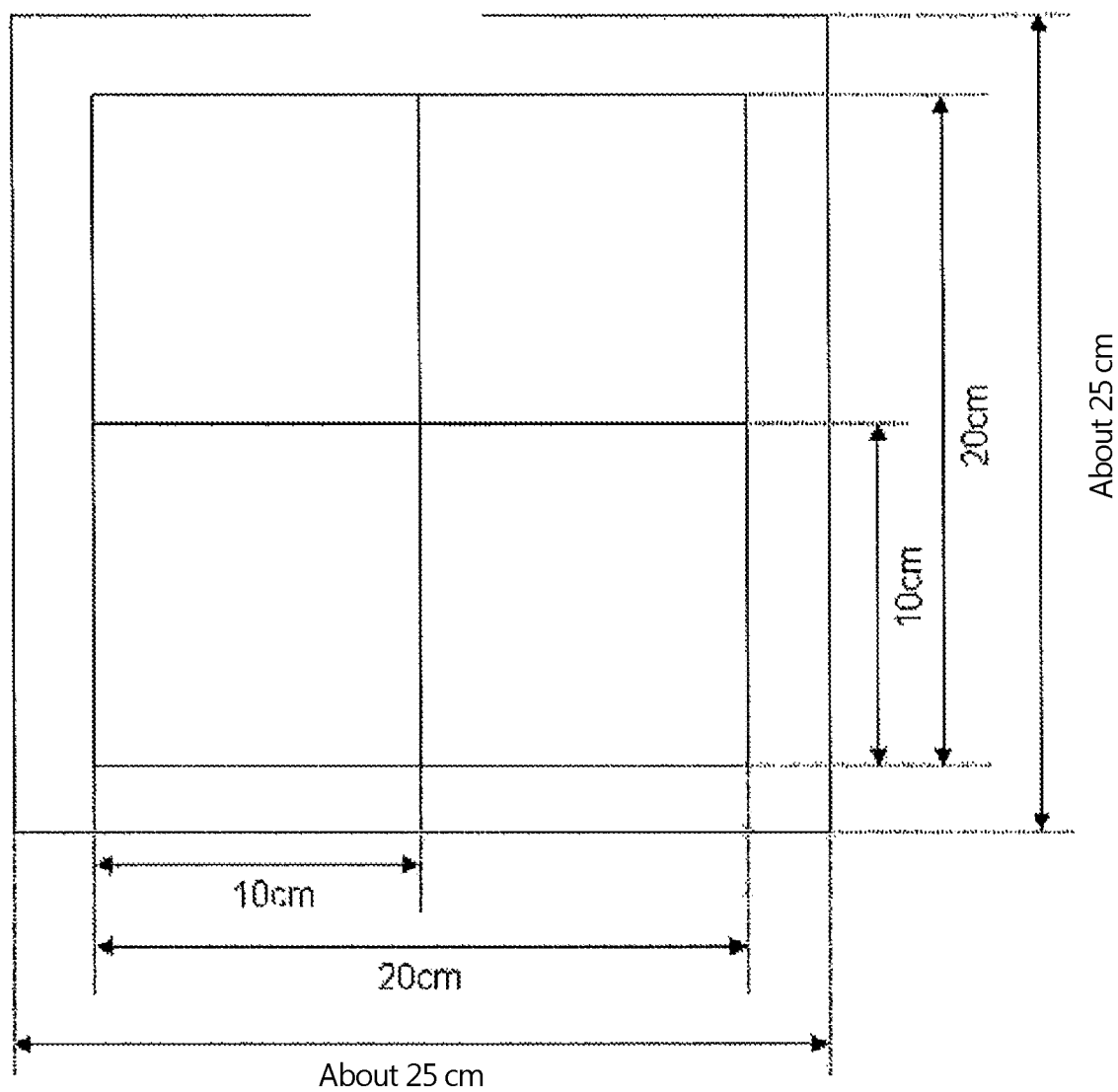
FIG. 1 is a diagram relating to a method for preparing test pieces for residual shrinkage measurement.

The airbag fabric obtained by present invention is described in detail below.

The fiber that constitutes the airbag fabric of present invention has a total fineness of 200 to 400 dtex, preferably 235 to 370 dtex, and more preferably 270 to 350 dtex. In view of light weight and compactness, the total fineness of the fiber that constitutes the airbag fabric is preferably as fine as possible. However, the total fineness should be at least 200 dtex, in view of heat capacity and tensile strength required for fabric. When the total fineness is less than 200 dtex, the obtained fabric has excellent light weight and compactness; however, it is insufficient in the heat capacity and tensile strength required for airbag fabric, which increases damage to the fabric during airbag deployment. On the other hand, when the total fineness exceeds 400 dtex, it is difficult to produce a lightweight and compact fabric.

The "fiber that constitutes the airbag fabric" referred to herein means yarn fibrillated from airbag fabric (hereinafter sometimes referred to as "fibrillated yarn"). The fibrillated yarn is different from original yarn used to produce airbag fabric.

The fiber (fibrillated yarn) that constitutes the airbag fabric of the present invention preferably has a fineness of single filament of 1 to 7 dtex, more preferably 2 to 5 dtex, and even more preferably 2.5 to 4 dtex. If the fineness of single filament is less than 1 dtex, fuzz due to single filament breakage is likely to occur. This leads to deterioration of spinning operability and weaving operability. On the other hand, if the fineness of single filament is more than 7 dtex, the single filament is thick, which increases rigidity of the fabric; and thus results in poor foldability during packing of the airbag, making it difficult to achieve compactness.

The airbag fabric of the present invention preferably has a cover factor (CF) of 1800 to 2200, more preferably 1900 to 2180, and even more preferably 2000 to 2160. When the cover factor is less than 1800, the fabric may have insufficient tensile strength, or yarn slippage at seams tends to occur. When the cover factor exceeds 2200, light weight and compactness cannot be achieved.

The cover factor (CF) is calculated according to the following formula.

$$CF=(A\times 0.9)^{1/2}\times (W1)+(B\times 0.9)^{1/2}\times (W2)$$

wherein A and B represent fineness (dtex) of the warp and weft of fabric; and W1 and W2 represent warp density and weft density (yarns/2.54 cm) of fabric.

The airbag fabric of the present invention preferably has a thickness of 0.3 mm or less, more preferably 0.28 mm or less, and even more preferably 0.26 mm or less. The lower the thickness, the higher the compactness. The lower limit of the thickness is not particularly limited, but is usually 0.1 mm or more.

The mass per unit area of the airbag fabric of the present invention is preferably 210 g/m² or less, more preferably 200 g/m² or less, and still more preferably 190 g/m² or less. A smaller mass per unit area is preferable from the viewpoint of light weight. The lower limit of the mass per unit area is not particularly limited, but is usually 100 g/m² or more.

The airbag fabric of the present invention preferably has a coefficient of compactness test, as described below, of 8000 to 11000 mm³, more preferably 8500 to 10500 mm³, and even more preferably 9000 to 10000 mm³. The coefficient of compactness test is an index of airbag packageability, and an airbag having a coefficient of compactness test of 11000 mm³ or less can achieve the required compactness. In terms of compactness alone, the coefficient of compactness test is preferably as low as possible. However, considering the balance of other mechanical properties, a coefficient of compactness test of 8000 mm³ or more is preferable.

The original yarn used to produce the airbag fabric of the present invention is preferably composed of high-strength fiber. There is a trade-off relationship between light weight/compactness and tensile strength of fabric. To achieve the former, the total fineness of the fiber that constitutes the fabric must be made thinner, or the weave density must be lowered; however, this results in a reduced tensile strength of the fabric. By using high-strength fiber as original yarn, light weight and compactness can be achieved while maintaining the tensile strength of fabric. The high-strength fiber as referred to herein means a fiber having a tensile strength of 9.0 cN/dtex or more. The tensile strength of the high-strength fiber is preferably as high as possible. However, as the tensile strength increases, fuzz is likely to occur in the original yarn. The high-strength fiber preferably has a tensile strength of 9.0 to 10.5 cN/dtex, more preferably 9.1 to 10.0 cN/dtex, and even more preferably 9.2 to 9.5 cN/dtex.

The high-strength fiber for use to produce the original yarn used to produce the airbag fabric of present invention preferably has a tensile strength of 16% or more, and less than 20%; more preferably 16.5% or more, and 19.5% or less; and even more preferably 17% or more, and 19% or less. When original yarn having a tensile elongation of less than 16% is used, fuzz is likely to occur during weaving, even when the weaving is performed under milder conditions.

The airbag fabric of the present invention preferably has a tensile strength of 550 N/cm or more, more preferably 580 N/cm or more, and even more preferably 610 N/cm, in both the warp and weft directions. When the tensile strength is less than 550 N/cm, occupants may not be sufficiently restrained during airbag deployment. The upper limit of the tensile strength is not particularly limited, but is usually 1000 N/cm or less.

The fiber that constitutes the airbag fabric of the present invention (fibrillated yarn) preferably has a tensile strength of 7.5 cN/dtex or more, more preferably 7.8 cN/dtex or more, in both the warp and weft directions. When the tensile strength of the fiber that constitutes the airbag fabric is less than 7.5 cN/dtex, it becomes difficult to maintain the strength required for the fabric. The upper limit of the tensile strength is not particularly limited. The fiber that constitutes the airbag fabric preferably has a tensile strength of 9.3 cN/dtex or less, and more preferably 9.0 cN/dtex or less, in view of spinnability and weaving operability, which are affected by fuzz generation when original yarn used to produce airbag fabric is strengthened in order to strengthen the fiber that constitutes the airbag fabric.

The airbag fabric of the present invention has an average edgecomb resistance retention in the warp and weft directions after heating at 210° C. for 30 seconds of 60% or more, preferably 65% or more, and more preferably 70% or more. Fabrics produced using thin-fineness original yarn that focus on light weight and compactness, and low-density fabrics, have a smaller heat capacity than fabrics of thick fineness and high density. Therefore, when an airbag of such thin fiber fabric deploys, stitch-merging tends to occur due to hot air passing through yarn slippage portions at seams. Accordingly, the edgecomb resistance of fabric measured at a high temperature after heating at 210° C. for 30 seconds is compared with the edgecomb resistance of the same fabric measured at ordinary temperature to determine the average of the edgecomb resistance retention percentage in the warp and weft directions, and this is defined as the average edgecomb resistance retention in the warp and weft direction after heating. When the average edgecomb resistance retention in the warp and weft directions after heating is controlled to 60% or more, yarn slippage is less likely to occur during deployment; and hot air can be suppressed from passing, to thereby mitigate damage to seams. The average edgecomb resistance retention in the warp and weft directions after heating is preferably as high as possible. The upper limit is not particularly limited, but is usually 95% or less.

The fiber that constitutes the airbag fabric of the present invention (fibrillated yarn) preferably has a thermal stress of 0.60 to 0.80 cN/dtex, more preferably 0.62 to 0.78 cN/dtex, and still more preferably 0.65 to 0.75 cN/dtex. To maintain the edgecomb resistance retention at a high level after heating, it is important to maintain, in the state of a fabric, a high thermal stress generated upon receipt of a high-temperature heat energy. When the airbag is exposed to a high temperature during airbag deployment by an inflator, such as a pyroinflator, the gaps between adjacent warp yarns and weft yarns are narrowed, in particular at seams, due high thermal stress, to thereby mitigate damage to the seams. When the thermal stress is less than 0.60 cN/dtex, the gap-narrowing effect is low. On the other hand, a thermal stress of more than 0.80 cN/dtex may cause local shrinkage unevenness during heating, and stable deployment performance is difficult to obtain.

The airbag fabric of the present invention has a residual shrinkage in both the warp and weft directions of 1.5% or less, preferably 1.4% or less, and more preferably 1.3% or less. When the residual shrinkage of the airbag fabric is greater than 1.5%, dimensional changes of the airbag fabric occur due to environmental changes over time in the packed airbag, whereby the airbag may not deploy correctly.

One of the methods for increasing the thermal stress is performing post-processing under mild conditions, or omitting scouring and heat-setting steps to allow shrinkage stress of the fiber to reside. However, such a method results in an increase in residual shrinkage of fabric.

As described above, a feature of the airbag fabric of the present invention is to provide an airbag fabric and a coated fabric for airbags that are lightweight and compact; that can maintain the weave strength required for airbags; that can mitigate damage to seams, which is a cause for concern; and that are stable over a long period of time. As a result of extensive research on the airbag fabric and coated fabric for airbags of the present invention, the present inventors achieved this feature by using the methods for producing original yarn and fabric, and the setting conditions, described below.

The methods for producing the original yarn and fabric for airbags used in the present invention are described in detail below.

Examples of materials for original yarn used to produce the airbag fabric and coated fabric for airbags of the present invention include polyamide fibers, such as nylon 66, nylon 6, nylon 12, nylon 46, a copolymer of nylon 6 with nylon 66, and a copolymer of nylon 6 with polyalkylene glycol, dicarboxylic acid, amine, or the like; polyester fibers, such as polyethylene terephthalate, polybutylene terephthalate, and like homopolyester fibers, and a copolymer of an acid component, which is a repeating unit of a polyester, with an aliphatic dicarboxylic acid, such as isophthalic acid, 5-sodium sulfoisophthalate, or adipic acid; aramid fibers, such as a copolymer of p-phenyleneterephthalamide with an aromatic ether; rayon fibers; polysulfone fibers; ultra-high-molecular-weight polyethylene fibers; and fibers composed of arranged polymer fibers having a sea-island structure mainly comprising the above synthetic fibers. Among these, polyamide fibers and polyethylene terephthalate fibers are preferable; and polyamide fibers, such as nylon 66 and nylon 6, are particularly preferable in view of impact resistance.

When fiber that constitutes the airbag fabric or the coated fabric for airbags of the present invention comprises a polyamide fiber, the polyamide resin of the fiber preferably has a relative viscosity to sulfuric acid of 3.0 or more, and more preferably 3.1 to 3.5. When the relative viscosity to sulfuric acid is less than 3.0, it is difficult to obtain a high-strength polyamide fiber, and an airbag fabric having a tensile strength required for airbags during airbag deployment may not be obtained. A relative viscosity to sulfuric acid of more than 3.5 not only causes poor cost efficiency, but also fails to neatly draw the yarn by existing equipment due to significant entanglement of molecular chains after spinning; this makes it difficult to obtain the desired high-strength original yarn of polyamide, and is thus undesirable from the viewpoint of versatility.

A part or all of the original yarn used to produce the airbag fabric of the present invention may be formed of recycled raw material(s). In order to improve the step passability in the production process, various additives may be incorporated, without problem, into the original yarn. Examples of usable additives include antioxidants, thermostabilizers, smoothing agents, antistatic agents, thickeners, flame retardants, and the like. Solution-dyed yarn, or yarn dyed after filature, can also be used without problem.

The original yarn used to produce the airbag fabric of the present invention can be produced in accordance with a standard method that comprises, for example, the following steps. A starting material resin is melt-extruded using an extruder such as a single-screw or twin-screw extruder, metered with a gear pump, and extruded into a nozzle through an appropriate metal nonwoven filter to provide a fibrous molten resin. The fibrous molten resin is then directly passed through a heating cylinder immediately below the nozzle, and cooled with cooling air. After applying a spinning oil agent, the resulting fibrous resin is wound around a feed roller and drawn as is, followed by an entanglement treatment to produce original yarn in the form of a multifilament.

In the production process described above, the fibrous molten resin extruded from the nozzle is solidified by applying cooling air in a cooling cylinder. It is important to dispose a heating cylinder or a heat-retention cylinder between the nozzle and the cooling cylinder in order to produce original yarn with high strength and high residual thermal stress. Adjusting the length from the nozzle surface to the cooling cylinder can delay fiber thinning, and prevent excessive fiber orientation. The length from the nozzle surface to the cooling cylinder (the length of the heating cylinder or heat-retention cylinder) is preferably 150 to 500 mm, and more preferably 200 to 400 mm.

The atmospheric temperature in the heating cylinder or the heat-retention cylinder is preferably 240 to 280° C., and more preferably 245 to 270° C. When the atmospheric temperature is lower than 240° C., fiber orientation proceeds excessively before drawing, and it becomes difficult to impart high strength and high thermal stress. When the atmospheric temperature exceeds 280° C., yarn unevenness of the fiber increases.

The velocity of cooling air in the cooling cylinder is preferably 0.2 to 1.0 m/sec, and more preferably 0.3 to 0.8 m/sec. When the cooling air has a velocity of less than 0.2 m/sec, cooling is not achieved, and unevenness between filaments easily occurs. When the cooling air has a velocity of more than 1.0 m/sec, the cooling rate becomes different between the upstream side and the downstream side of the cooling air, and unevenness between filaments tends to easily occur.

Controlling the cooling-air velocity distribution is important to produce uniform and high-strength original yarn. Specifically, it is important to control the cooling-air velocity distribution in the cooling cylinder, in terms of CV %, to 9% or less, and more preferably 7% or less. To control the cooling air velocity distribution, for example, porous mesh filters having rectifying action and layered on top of each other can be used. As the cooling cylinder, an annular-type or a lateral-type cooling cylinder is generally used; either of these can be used.

A spinning-nozzle draft refers to a ratio of the velocity of the first feed roller (B) to the linear velocity of single filament fiber (A) when a polyamide resin is melted and extruded from a spinning pack into air through a nozzle in the process of producing the original yarn used to produce the airbag fabric of the present invention. The spinning-nozzle draft (B/A) is preferably 120 to 200, and more preferably 140 to 180. When the spinning-nozzle draft is 100 or more, yarn tension immediately below the nozzle increases to improve the cross-sectional uniformity of fibers. Accordingly, fibers can be supplied to a drawing step with molecular chains being drawn and arranged in lines, thereby suppressing non-uniformity of the single filament cross-sectional diameter; i.e., providing original yarn having excellent uniformity. A higher spinning-nozzle draft provides a higher effect of drawing and arranging the molecular chains in lines, and is thus preferable. However, an overly high spinning-nozzle draft tends to deteriorate appearance quality, because fuzz tends to occur in the drawing step. Therefore, the spinning-nozzle draft is preferably 220 or less, as described above.

In the production process described above, it is necessary to apply an oil agent to the fiber when the fiber is wound up on a first feed roller. Examples of the method for applying an oil agent include the guide oiling method and the roller oiling method. Either of these methods can be used. The oil agent for use may be a known oil agent.

In the drawing step, it is necessary to perform multi-stage drawing comprising two or more stages using a drawing roller that can freely change the amount of heat given to yarn (temperature) and the draw ratio; and then perform heat-setting and relaxation treatment to set a high total draw ratio.

In first-stage drawing, cold-drawing is preferably performed, using a roll of 30 to 100° C. In second-stage drawing, hot-drawing is preferably performed, using a roll of 150 to 250° C. A known drawing method can be used. The cold/hot draw ratio, which is a ratio of cold-drawing to hot-drawing, is obtained according to the following formula.

Cold/hot draw ratio=Cold-drawing ratio/Hot-drawing ratio

Herein, the cold-drawing ratio refers to a speed ratio between rollers used to perform cold-drawing. The hot-drawing ratio refers to a speed ratio between rollers used to perform hot-drawing.

The ratio of the cold-drawing step to the hot-drawing step greatly affects the physical properties of the obtained original yarn. When a high-strength yarn with high thermal stress is to be produced, it is important to draw molecular chains of original yarn as much as possible in the cold-drawing step. To achieve this, it is necessary to set the cold/hot draw ratio, which is a ratio of cold-drawing to hot-drawing, to the range of 1.5 to 2.8, and more preferably 1.8 to 2.4.

In the cold-drawing step, if the drawing temperature is overly low, the movement of molecular chains is insufficient, which causes fuzz generation during drawing. On the other hand, if the drawing temperature is excessively high, a lower tension will result, which leads to drawing unevenness in the subsequent drawing step, causes fuzz generation, and deteriorates the mechanical properties of the yarn. Therefore, the drawing temperature is preferably 30 to 100° C., more preferably 40 to 90° C., and even more preferably 45 to 85° C.

In the hot-drawing step, if the drawing temperature is low, an excessively high tension will result. This increases friction with rollers and leads to fuzz generation, and is thus not preferable. On the other hand, if the drawing temperature is overly high, crystallization excessively proceeds during drawing, which causes fuzz in drawing, or makes it difficult to control the subsequent heat-setting. Therefore, the drawing temperature is preferably 150 to 250° C., more preferably 160 to 240° C., and even more preferably 170 to 230° C.

As long as the drawing step comprises more than two stages, the number of stages is not particularly limited.

In the heat-setting step, heat is applied to the yarn that is traveling in a state of tension. For example, heat-setting can be performed by allowing the yarn to travel over a roller whose surface temperature is set at a predetermined temperature. In the present invention, it is important to perform heat-setting at a high temperature. The heat-setting temperature is preferably 210 to 240° C., and more preferably 215 to 235° C. When the heat-setting temperature is lower than 210° C., the effect of heat-setting the molecular chains is not sufficient; tight winding of original yarn is induced, and thus the original yarn cannot be stably released. Furthermore, a constant thermal stress cannot be maintained, even after the yarn is woven into fabric. When the heat-setting temperature exceeds 240° C., oxidative degradation of molecules proceeds, and the strength of the original yarn decreases.

After the heat-setting step, it is necessary to relax tension in order to perform a relaxation treatment. This can be achieved, for example, by making the roll-to-roll rotational speed ratio lower than in the previous step. In the present invention, it is important to make the relaxation ratio as low as possible. The relaxation ratio is preferably 2 to 4%, and more preferably 2.5 to 3.5%. By lowering the relaxation ratio, excessive drawing for the purpose of achieving the desired total draw ratio can be minimized. Therefore, the strength of the original yarn can be increased without excessively increasing the draw ratio, whereby original yarn with less fuzz can be produced. Furthermore, lowering the relaxation ratio also leads to an increase in the shrinkage percentage during post-processing after weaving; and milder conditions can be set for weaving, as described later. Therefore, a stable production operation can be performed without using high-strength yarn made of a special high-viscosity resin. Moreover, lowering the relaxation ratio is very important, because performing a shrinkage step during post-processing narrows the gaps between adjacent warp warns and weft yarns during the processing even when milder conditions are used for weaving; and yarn slippage resistance of the fabric can be enhanced. The problems encountered in the prior art when the relaxation ratio is excessively low are poor release of original yarn due to residual tension, and residual shrinkage after weaving into fabric. The present inventors found that these problems can be solved by using the above-mentioned specific spinning conditions and drawing conditions. When the relaxation ratio is less than 2%, the residual tension of the wound yarn is overly high, which results in a poor packaging shape and difficulty in release; and causes tight winding. If the relaxation ratio exceeds 4%, it is difficult to obtain the shrinkage percentage required in the processing step. Furthermore, the high-strength yarn or original yarn of high thermal stress required in the present invention cannot be obtained.

The filaments of the drawn yarn obtained above are entangled, and the entangled filaments were wound up by known methods. The number of entanglements imparted to the filaments of the yarn may be changed by using an appropriate entangling device and entangling conditions so as to achieve 15 to 25 entanglements per meter.

In the production of high-strength original yarn of the present invention, the total draw ratio is preferably 4.8- to 5.4-fold, more preferably 4.9- to 5.3-fold, and even more preferably 5.0- to 5.2-fold. If the total draw ratio is less than 4.8-fold, the yarn strength is low, and the required weave strength cannot be obtained. If the total draw ratio exceeds 5.4-fold, single filament breakage of filaments occurs, and is thus not preferable.

The original yarn produced by the above method preferably has a boiling-water shrinkage of more than 7.0%, and 12% or less; more preferably 7.5% or more, and 11.8% or less; and even more preferably 8.0% or more, and 11.5% or less. By setting the boiling-water shrinkage percentage at a high level, original yarn can be effectively strengthened and efficiently woven into high-density fabric under mild weaving conditions, and the yarn slippage resistance of fabric can be significantly enhanced.

The original yarn of the present invention preferably has a coefficient of variation of single filament cross-sectional diameter, which is determined by the measurement method described below, of 20% or less, more preferably 18% or less, and even more preferably 16% or less. By using the above-mentioned spinning/drawing conditions, original yarn having high thermal stress, high strength, and excellent appearance quality can be obtained. The lower limit of the coefficient of variation is not particularly limited, but is usually 3% or more.

Next, the method of producing the airbag fabric of the present invention is described.

The loom used to weave the airbag fabric of the present invention is not particularly limited. Examples of usable looms include a water-jet loom, an air-jet loom, a rapier loom, and the like. To increase the productivity, a water-jet loom, which can rotate at a high speed, is preferred.

The woven structure of the airbag fabric of the present invention is not particularly limited. Plain weave is preferable in view of tensile strength of fabric and yarn edgecomb resistance at seams.

The warp tension during weaving of the airbag fabric of the present invention is preferably as mild a condition as possible. The tension applied to the warp is preferably 0.18 to 0.34 cN/dtex, more preferably 0.19 to 0.32 cN/dtex, and even more preferably 0.20 to 0.28 cN/dtex. A warp tension of less than 0.18 cN/dtex causes significant weave shrinkage at the beating point when the fabric is woven; and in weft insertion, stable yarn traveling becomes difficult, which causes significantly poor weaving performance. When the warp tension exceeds 0.34 cN/dtex, continuous opening movement during weaving and damage to warp due to rod handling occurs; and single filament breakage causes warp fuzz generation, which reduces loom operation efficiency, increases the number of defects, and reduces tensile strength of fabric in the warp direction.

The airbag fabric of the present invention is preferably woven at a rotational speed of 900 rpm or less, more preferably 800 rpm or less, and even more preferably 750 rpm or less. If the rotational speed is increased to more than 900 rpm, continuous opening movement during weaving and damage to the warp due to rod handling increase; thus, stable loom operation cannot be performed.

By setting the weaving tension to be mild as described above, the airbag fabric of the present invention can be woven with a high operation efficiency being maintained, even at a high rotational speed of more than 600 rpm.

With respect to other settings for the loom, known settings can be used, without particular limitation.

The airbag fabric of the present invention produced by the above method can reduce the number of times the loom stops due to weft insertion error to 2.0 times/hour or less, and can be produced with high efficiency. When the number of times the loom stops exceeds 2.0 times/hour, operation efficiency deteriorates. The number of times the loom stops is more preferably 1.5 times/hour or less, and even more preferably 1.0 times/hour or less.

It is important for gray fabric woven on the loom to be subsequently subjected to scouring, shrinkage processing, and drying steps.

Scouring processing is important to obtain yarn slippage resistance required for fabric by appropriately removing an excess of fiber oil agent. As for the scouring method, known methods and conditions can be used. For example, the scouring processing can be performed by using a scouring agent, such as alkylbenzene sultanate; or by hot-water treatment simultaneously performed with the shrinkage processing described below.

The shrinkage processing method is not limited. For example, shrinkage processing using hot water or shrinkage processing by passing the fabric through a heating furnace can be performed. A shrinkage step using hot water is preferable in view of reducing the residual shrinkage percentage of airbag fabric, improving yarn slippage resistance, and increasing thermal stress.

The shrinkage processing using hot water is preferably pertained by passing woven gray fabric through a hot-water bath of 80 to 100° C., more preferably 85 to 99° C. When the hot-water bath temperature is lower than 80° C., shrinkage required for fabric occurs insufficiently, which reduces yarn slippage resistance of the fabric or increases the residual shrinkage percentage. The processing time is preferably 15 seconds to 3 minutes, more preferably 20 seconds to 2 minutes. A processing time of less than 15 seconds tends to increase the residual shrinkage percentage, whereas a processing time of more than 3 minutes reduces the production efficiency.

The shrinkage processing by passing the fabric through a heating furnace is preferably performed at 160 to 200° C., and more preferably at 170 to 190° C. When the processing temperature is lower than 160° C., the amount of heat necessary for shrinkage is insufficiently provided, which makes it difficult to impart the necessary yarn slippage resistance. On the other hand, when the processing temperature exceeds 200° C., the thermal stress at high temperatures is reduced, which tends to reduce the edgecomb resistance retention at high temperatures. The processing time is preferably 30 seconds to 2 minutes, more preferably 40 seconds to 1 minute 30 seconds. When the processing time is less than 30 seconds, the necessary shrinkage is not performed, and poor yarn slippage resistance will result. On the other hand, when the processing time is more than 2 minutes, oxidative degradation of the polymer proceeds, which reduces the fabric strength.

Subsequently, the fabric is preferably subjected to a dry-finishing step. However, when heat-shrinkage processing is performed using a heating furnace, the dry-finishing step can be omitted. There is no particular limitation on equipment. For example, two-stage drying zones can be provided to allow the fabric to pass through zones where the temperatures can be set to two different levels. The method for providing two-stage drying zones includes, for example, disposing a partition in the same dryer, so as to change the atmosphere temperature; or providing separate units to create independent systems. The dryer for use is preferably a suction drum-dryer, because it is space-saving and provides highly efficient drying.

For example, in two-stage drying, when the first-stage setting temperature is defined as T1 and the second-stage setting temperature is defined as T2, the dry-finishing temperature is preferably performed under the following temperature conditions: T1=50 to 170° C. and T2=50 to 190° C., more preferably T1=70 to 130° C. and T2=90 to 150° C. When T1 is less than 50° C., the effect as a preliminary drying step cannot be provided; whereas when T1 is higher than 170° C., wrinkles and the like occur due to rapid drying, resulting in poor fabric quality. When T2 is lower than 50° C., a sufficient amount of heat cannot be provided to pre-dried fabric, and poor heat stability will result. As a result, shrinkage occurs due to heat during storage in an automobile under the hot sun in summertime, which causes a dimensional change, and leads to problems during deployment.

The airbag fabric of the present invention produced by the above method can be produced with the number of warp fuzz defects being reduced to 3.0 fuzzes/(length 100 m×width 1.5 m) or less. If the number of warp fuzz defects is more than 3.0 fuzzes/(length 100 m×width 1.5 m), the frequency of loom stops increases during weaving, which results in poor production efficiency and a poor yield when the fabric is processed into airbags. The number of warp fuzz defects is more preferably 2.5 fuzzes/(length 100 m×width 1.5 m) or less, and still more preferably 2.0 fuzzes/(length 100 m×width 1.5 m).

The airbag fabric of the present invention can also be effective as a coated fabric for airbags, which is produced by applying a coating resin to the surface of the fabric using a known technique.

The coated fabric for airbags of the present invention may be a double-side coated fabric, which is obtained by applying a coating to both sides of the fabric. However, in view of packageability, a single-side coated fabric coated, which is obtained by applying a coating only to one side, is more preferable.

The coating resin for use in the present invention is not particularly limited. Known resins can be used. Specific examples include the most commonly used silicone resins, as well as polyurethane resins, acrylic resins, polyester resins, polyamide resins, and aqueous dispersants of such resins.

The method for applying the coating resin may be a known resin coating method. In view of ease of adjustment of the coating amount and influence of foreign matter (protrusion) contamination, a knife-on-air method is the most preferable. The knife for use in knife coating is not particularly limited in blade edge shape, and known knives can be used. For examples, the blade edge of the knife may have a semicircular shape, an angular shape, or the like.

During coating, it is necessary to apply tension in the length direction of the fabric. This tension is preferably set to 0.02 to 0.12 cN/dtex. By setting the tension within this range, a coated fabric with reduced coating unevenness and good appearance quality can be obtained as a final product. The tension is preferably 0.04 to 0.11 cN/dtex, and more preferably 0.06 to 0.10 cN/dtex.

As the method for drying and curing the coating agent after application, general heating methods, such as hot air, infrared light, and microwave, can be used. The heating temperature and time are not limited, as long as a temperature high enough to cure the coating resin is obtained. For example, when a non-solvent silicone resin is used, the heating temperature is preferably 150 to 220° C., and the heating time is preferably 0.2 to 5 minutes.

The coated fabric for airbags has a coefficient of compactness test, described later, of 8000 to 11000 mm³, preferably 8500 to 10500 mm³, and more preferably 9000 to 10000 mm³. The coefficient of compactness test is an index of packageability of airbags. When the coefficient of compactness test is 11000 mm³ or less, the required compactness can be achieved. Considering only compactness, the coefficient of compactness test value is preferably as low as possible. However, considering the balance of other mechanical properties, the coefficient of compactness test is preferably 8000 mm³ or more.

The coated fabric for airbags described above has an average edgecomb resistance retention in the warp and weft directions after heating at 210° C. for 30 seconds of 60% or more, preferably 65% or more, more preferably 70% or more. Fabrics produced using thin-fineness original yarns that focus on light weight and compactness, and low-density fabrics, have a smaller heat capacity than thick-fineness and high-density fabrics; and tend to easily have stitch-merging due to hot air passing through yarn slippage portions at seams when an airbag deploys. The average edgecomb resistance retention after heating herein refers to a percentage of retention of edgecomb resistance of a fabric, which is determined by comparing the edgecomb resistance measured at a high temperature after heating at 210° C. for 30 seconds to the edgecomb resistance determined at ordinary temperature. Setting the average edgecomb resistance retention after heating to 60% or more can reduce the occurrence of yarn slippage during deployment and suppress hot air from passing therethrough, thus reducing damage to seams. The average edgecomb resistance retention in the warp and weft directions after heating is preferably as high as possible. The upper limit is not particularly limited, but is usually 95% or less.

The residual shrinkage of the coated fabric for airbags is 1.5% or less, preferably 1.4% or less, more preferably 1.3% or less, in both the warp and weft directions. When the coated fabric for airbags has a residual shrinkage of greater than 1.5%, dimensional changes of the coated fabric for airbags may occur due to environmental changes over time in the packed airbag; therefore, the airbag may not correctly deploy.

One of the methods for increasing the thermal stress is a method of allowing the tensile stress of fabric to reside by performing post-processing under milder conditions, or omitting scouring and/or heat-setting steps. However, this method increases the residual shrinkage of the fabric.

The coated fabric for airbags preferably has a thickness of 0.3 mm or less, more preferably 0.28 mm or less, and even more preferably 0.26 mm or less. The lower the thickness, the higher the compactness. The lower limit of thickness is not particularly limited, but is usually 0.1 mm or more.

The mass per unit area of the coated fabric for airbags of the present invention is preferably 240 g/m² or less, more preferably 230 g/m² or less, and even more preferably 220 g/m² or less. The mass per unit area is preferably small from the viewpoint of light weight. The lower limit of the mass per unit area is not particularly limited, but is usually 110 g/m² or more.

The tensile strength of the coated fabric for airbags is preferably 550 N/cm or more, more preferably 580 N/cm or more, and even more preferably 610 N/cm in both the warp and weft directions. When the tensile strength is less than 550 N/cm, occupants may not be sufficiently restrained during airbag deployment. The upper limit of the tensile strength is not particularly limited, but is usually 1000 N/cm or less.

EXAMPLES

The present invention is described below in detail with reference to Examples. The present invention is not limited to these Examples. The details of the Examples and methods for measuring various physical properties are described.
(1) Relative Viscosity to Sulfuric Acid (RV)

After 0.2 g of a sample was fully dissolved in 96% sulfuric acid (20 ml), the resulting solution was allowed to stand in an environment at a water temperature of 20° C. for 5 minutes, and the drop time of the solution was then measured using an Ostwald viscometer. The drop time of the solvent was also evaluated in the same manner. The RV was obtained according to the following formula.

$$\text{Relative viscosity to sulfuric acid } RV = \text{Sample drop time (sec.)/Solvent drop time (sec.)}$$

(2) Ambient Temperature in Heating Cylinder

Using an SE60949 temperature sensor manufactured by Anritsu Meter Co., Ltd., temperatures at the upper, middle, and lower portions of the heating cylinder were measured. The average values were recorded. The upper portion refers to a point located 5 cm below the top of the heating cylinder in the vertical direction. The lower portion refers to a point located 5 cm above the bottom of the heating cylinder. The middle portion refers to a point at the center of the heating cylinder. These portions were all measured at points that are at the center in the width direction, and 10 cm away from the back.
(3) Velocity Distribution of Cooling Air Using a Model 6141 anemometer manufactured by Kanomax Inc., 4 points were arbitrarily selected in the width direction of a quenching part. The air velocity was measured at 9 points arbitrarily selected in such a manner that the points were distributed as evenly as possible in the vertical direction of the selected 4 points. That is, a coefficient of variation CV % at a total of 36 measurement points was calculated.
(4) Total Fineness of Original Yarn The total fineness was measured in accordance with method A of JIS L1013 (2010) 8.3.
(5) Total Fineness of Fiber that Constitutes Airbag Fabric (Fibrillated Yarn)

The total fineness of the fiber that constitutes airbag fabric (fibrillated yarn) was determined in the following manner. The warp and weft yarns of the airbag fabric were individually fibrillated and measured in accordance with method B of JIS L 1013 (2010) 8.3. More specifically, after a bundle of a sample (multifilament) having a length of exactly 30 cm was obtained under the initial load, its absolute dry mass was weighed, and the total fineness (dtex) was calculated according to the following formula. The average of five measurements in each of the warp and weft yarns was defined as the total fineness of the warp and weft yarns.

$$\text{Total fineness} = 1000 \times m/L \times (100 + RO)/100$$

In the formula, L represents the length of the sample (m); m represents the absolute dry mass of the sample (g); and RO represents the official moisture content (%).

(6) Fineness of Single Filament

Fineness of single filament was calculated by dividing the total fineness obtained in (4) or (5) by the number of filaments constituting the multifilament.

(7) Tensile Strength and Elongation of Fiber

The measurement was performed in accordance with the method of JIS L1017 (2002) 8.5. The tensile strength of the multifilament was measured by using a "Tensilon RTM-250" manufactured by Orientec Corporation, and the tensile strength of the fiber was calculated by dividing the tensile strength of the multifilament by the total fineness obtained in (4) or (5) above. The elongation of the fiber was determined from elongation at the point showing the maximum strength in the S-S curve.

The fibrillated yarn was measured by carefully removing a yarn having a sample length of about 40 cm from the fabric so as not to break apart the multifilaments.

(8) Boiling-Water Shrinkage

The measurement was performed by the method of JIS L1017 (2002) 8.14.

(9) Coefficient of Variation of Single Filament Cross-Sectional Diameter of Original Yarn Using a microscope (VH-6300) lens (VH-Z450) manufactured by Keyence Corporation, the cross-sectional diameter of each filament of the original yarn multifilament was measured under 1000× magnification. The coefficient of variation CV % of the single filament cross-sectional diameter was calculated by the following formula. The higher the CV % value, the greater the variation.

Coefficient of variation of single filament cross-sectional diameter (CV %)=($\sigma$/X)×100 wherein $\sigma$ represents the standard deviation, and X represents the average value. The average value and standard deviation of variation were obtained by arbitrarily sampling 20 samples in the length direction of wound yarn; then measuring the single filament cross-sectional diameter of each sample by the above method, and calculating the average value and standard deviation.

(10) Weave Density

The measurement was performed by Method A of JIS L1096 (2010) 8.6.

(11) Mass Per Unit Area

The measurement was performed in the same manner as in the method of JIS L1096 (2010) 8.3.1, except that two 10 cm×10 cm test pieces were used as samples.

(12) Thickness

The measurement was performed in accordance with method A of JIS L1096 (2010) 8.4.

(13) Tensile Strength and Tensile Elongation of Fabric

The measurement was performed in accordance with method A (labeled strip method) of JIS L 1096 (2010) 8.14, using a "Tensilon RTM-250" manufactured by Orientec Corporation. Each test piece having a width of 50 mm was gripped and tested at a tension rate of 200 mm/min with a grip distance of 200 mm until the sample was broken to determine the strength (N) and the elongation (%) at break. However, samples that were broken within a distance of 10 mm from the grip, and samples that were abnormally broken were excluded.

(14) Edgecomb Resistance Before Heating and after Heating, and Average Edgecomb Resistance Retention in the Warp and Weft Directions after Heating at 210° C. for 30 Seconds With each of the warp and weft directions being the major axis, 5 cm×15 cm samples were cut out. Each sample was set to an edgecomb resistance jig used in ASTM D6479-15.

Using an RTM-500 tensile tester manufactured by Toyo Baldwin Co., Ltd., the jig was cramped by the upper chuck, and fixed. The sample was cramped by the lower chuck in such a manner that the distance between the chucks was 10 cm. The entirety of the sample and the slippage jig chucks was placed in a movable oven heated at 210° C., and allowed to stand in this state for 30 seconds. The temperature at that time was between 195° C. and 205° C. When the temperature was lower than 195° C., the measurement was performed again from the beginning using another sample. After the sample was allowed to stand, edgecomb resistance was measured at a crosshead speed of 200 mm/min. A total of 5 measurements were performed in each direction, and the average value was recorded. The results of the warp direction indicate edgecomb resistance of the weft yarn, whereas the results of the weft direction indicate edgecomb resistance of the warp yarn.

Next, using the same jig, edgecomb resistance was measured in an unheated state (before heating) in the same manner as above. This was used as a blank.

Using the samples of warp and weft directions, the edgecomb resistance after heating and edgecomb resistance before heating (at ordinary temperature) were calculated as the average edgecomb resistance in the warp and weft directions according to the following formula.

Average edgecomb resistance in warp and weft directions before heating (N)=(Average edgecomb resistance in warp direction before heating)+(Average edgecomb resistance in weft direction before heating)/2

Average edgecomb resistance in warp and weft directions after heating (N)=(Average edgecomb resistance in warp direction after heating)+(Average edgecomb resistance in weft direction after heating)/2

Furthermore, the average edgecomb resistance retention in the warp and weft directions after heating at 210° C. for 30 seconds was calculated according to the following formula.

Average edgecomb resistance retention (%) in warp and weft directions after heating at 210° C. for 30 seconds=Average edgecomb resistance in warp and weft directions after heating (N)/Average edgecomb resistance in warp and weft directions before heating (N)×100

(15) Packageability Test

Each sample was cut to 21 cm in the warp direction×20 cm in the weft direction. The sample was folded 3 times in the weft direction in an accordion-like manner so that the weft width was 5 cm. Further, the fabric was folded twice in the warp direction in an accordion-like manner so that the warp width was 7 cm. 100 g of a 7 cm×5 cm iron plate was placed on top of the folded sample in a careful manner such that the sample did not protrude from the iron plate. A 10 cm×15 cm metal press panel used in ASTM D6478 was set as an attachment to an RTM-500 tensile-indentation tester (manufactured by Toyo Baldwin Co., Ltd.), and the sample was disposed at the center position of the press panel. The sample was subjected to a compression test by pressing in the vertical direction at a press speed of 25 mm/min. The base fabric thickness at 196 N was measured, and the coefficient of compactness test was calculated according to the following formula. The measurement was performed 5 times, and the average of the 5 measurements was used.

Coefficient of compactness test (mm$^3$)=Thickness of folded base fabric at 196N load (mm)×bottom area (70 mm×50 mm)

(16) Residual Shrinkage

Samples were prepared by pre-drying to a constant weight in a constant-temperature dryer at a relative humidity of 10 to 25%, and at a temperature not exceeding 50° C. After the pre-dried sample was placed in a testing room at a temperature of 20±2° C. and a relative humidity of 65±2% to achieve a constant weight, the sample was then cut into 25 cm in the warp direction×25 cm in the weft direction to prepare two sheets of square samples. Test pieces marked as shown in FIG. 1 were prepared, and the length between the marks on the test pieces (length before processing: a cm) was measured. After the test pieces were placed in a constant-temperature dryer of 150° C. and allowed to stand for 30 minutes, the test pieces were removed from the dryer and allowed to stand in a place at a temperature of 20±2° C. and a relative humidity of 65±2% for 1 hour or more. The length between the marks on the test pieces (length after processing: b cm) was measured. The residual shrinkage was calculated according to the following formula.

Residual Shrinkage (%)=$(a-b)/a \times 100$

(17) Thermal Stress of Fibrillated Yarn

The measurement was performed using a KE-2S device manufactured by Kanebo Engineering, Ltd.

Figure 2:
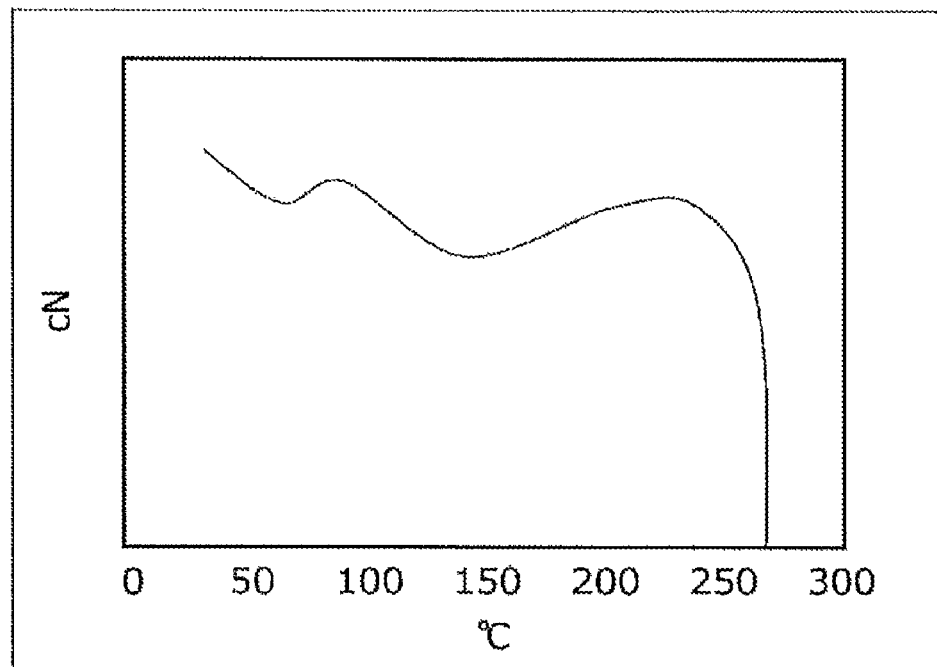
FIG. 2 is an exemplary graph showing the results of measuring the thermal stress of fibrillated yarn.

Samples were prepared by removing yarn from the fabric, and tying the yarn into a ring with an inner diameter of 50 mm. The measurement was performed in a thermal stress mode (LOAD) as the measurement mode, under an initial load of 0.8 cN/dtex, and at a temperature increase rate of 150° C./min, to measure the thermal stress over time. FIG. 2 shows the obtained graph. The maximum stress achieved after the temperature reached 200° C. was defined as the thermal stress value.

(18) Cover Factor (CF)

The cover factor was calculated by the following formula.

$$CF = (A \times 0.9)^{1/2} \times (W1) + (B \times 0.9)^{1/2} \times (W2)$$

wherein A and B represent the warp thickness and weft thickness (dtex) of the fabric; and W1 and W2 represent the warp weave density and weft weave density (yarns/2.54 cm) of the fabric.

(19) Loom Operation Efficiency

A water-jet loom (ZW8100) manufactured by Tsudakoma Corp. was operated at a rotational speed of 700 rpm for 24 hours, and the number of times the loom stopped was counted. When the loom stopped, operation was resumed within 5 minutes by treating the problem to remove the cause thereof. Original yarn without fuzz was used for the weft, and relative evaluation was performed using the same loom.

○: The loom stopped 24 times or less.

Δ: The loom stopped 25 to 50 times.

x: The loom stopped 51 times or more.

(20) Number of Weft Insertion Errors

The number of weft insertion errors that occurred in the above operation efficiency evaluation was counted. The number of loom stops per hour was calculated according to the following formula.

Number of loom stops due to weft insertion error (times/hr)=Total number of loom stops due to weft insertion error during the operation time (times/24 hr)/operation time (hr)

(21) Number of Fuzz Defects

The final fabric in the above operation efficiency evaluation test was inspected, and the number of warp fuzz defects of 1.0 mm or more per 100 m in fabric length was counted according to the following formula.

Number of warp fuzz defects (defects/100 m×width 1.5 m)=Number of warp fuzz defects in the total fabric length (defects)/Total fabric length ($m$×width 1.5 m)×100

(22) Damage to Seams in Deployment Test

Two sheets of airbag fabric, each cut out into a circle, were layered on top of each other. Using 1300 dtex nylon 66 sewing yarn for the upper and lower yarns, double-lock stitching 2 cm inwardly from the outermost periphery was performed along the outer periphery at a pitch of 2.5 mm to produce an airbag with a capacity of 40 L. A deployment test was performed with the vent hole diameter being adjusted so that the maximum pressure after static airbag deployment was 30 kPa. The inflator and other evaluation devices used in this test were common, known devices. In consideration of test variability, the test was performed three times in total.

The bag after deployment was inspected for evaluation according to the following criteria, and recorded.

X: Stitch-merging (a phenomenon in which adjacent stitch holes are connected to each other due to melting caused by hot air passing through seams) occurred in one or more portions two or more times out of the three times of testing.

Δ: Stitch-merging occurred in one or more portions only once out of the three times of testing.

○: No problems were observed in the three times of evaluation.

Δ and ○ were defined as acceptable.

(23) Coating Amount

The mass of the coated fabric was measured according to the method of JIS L-1096 8.4.2. Subsequently, as a blank sample, processing was performed without applying the resin, under the same conditions as those for the coated fabric, and the mass of the resulting blank sample was then measured in accordance with the method of JIS L-1096 8.4.2. The difference between the mass of the coated fabric and the mass of the blank sample was then calculated as the coating amount. The coating amount (g/m$^2$) was expressed in terms of mass per square meters (g/m$^2$).

(24) Tension During Coating

The tension during coating was set to a predetermined tension using the tension calculated from the torque of the roller on the fabric winding side. A value calculated by dividing this value with fabric width, warp weave density, and fineness was used.

Example 1

Figure 3:
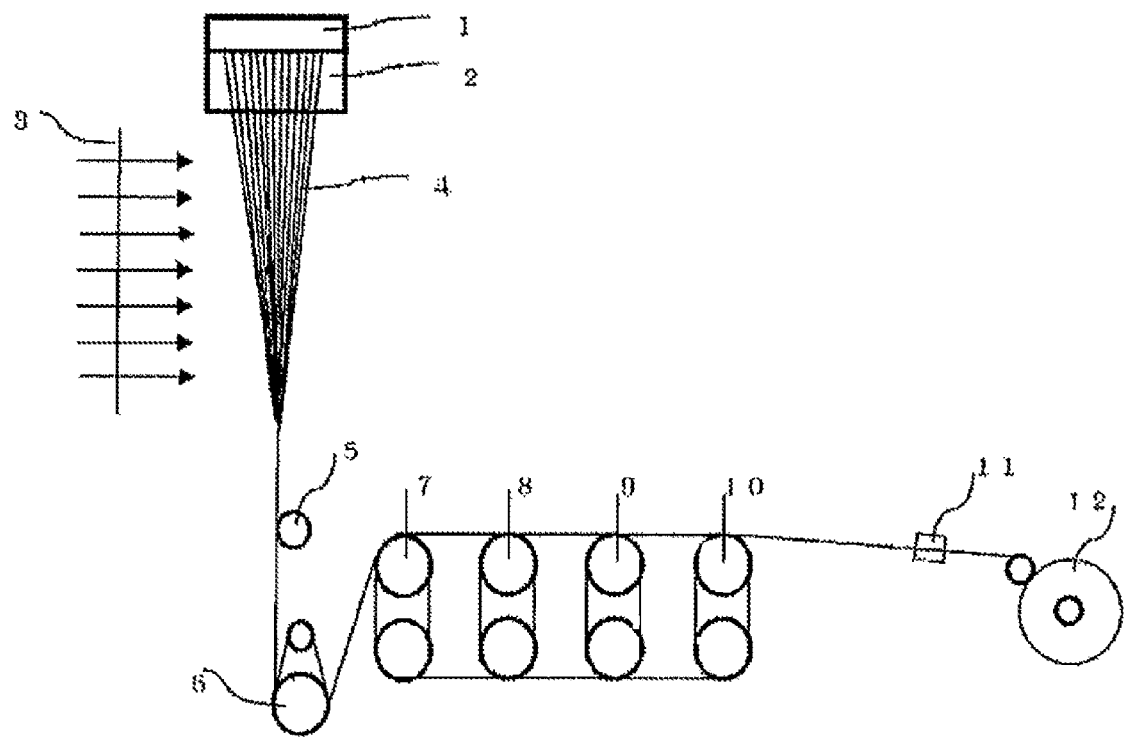
FIG. 3 is a diagram illustrating an example of a production apparatus for producing original yarn used in present invention.

A nylon 66 polymer in the form of pellets having a relative viscosity RV to sulfonic acid of 3.2 was melted at a temperature of 300° C. using an extruder, then spun using the production equipment shown in FIG. 3. After the molten polymer was homogenized to a temperature of 295° C. using a spin head, the resulting polymer was metered with a gear pump in such a manner that the yarn after winding had a total fineness of 235 dtex; and was spun through a spinneret pack. The spun yarn passed through a 300 mm heat-retention cylinder whose atmospheric temperature was controlled at 260° C., and was solidified by cooling with quenching air whose velocity distribution was controlled at 6% to form yarn at a nozzle draft ratio of 150. After an oil agent was applied to the solidified yarn by a known method, the yarn was taken up by a feed roller without being wound once. The obtained yarn was subjected to cold-drawing at 50° C. and hot-drawing at 180° C., at a cold/hot draw ratio of 2.0. The drawn yarn was heat-set at a temperature of 230° C., subjected to a 3% relaxation treatment; then appropriately entangled using a known entanglement device, and wound on a wind-up machine. The total drawing ratio at that time was 5.2-fold. Table 1 shows physical properties of the obtained original yarn.

Using the obtained 235 dtex nylon 66 original yarn for the warp and weft, and using a Tsudakoma water-jet loom (ZW8100), a fabric was woven at an on-machine density of 68 yarns/2.54 cm for both the warp and weft; at a loom rotation speed of 700 rpm; and at a warp average tension of 0.25 cN/dtex. The obtained fabric was passed through a 98° C. hot-water bath, and subjected to a hot-water shrinkage treatment while adjusting the processing tension to achieve a traveling tension of 0.026 cN/dtex in the warp direction. Subsequently, the fabric was subjected to drying under a traveling tension of 0.026 cN/dtex in the warp direction to obtain a plain weave fabric with a weave density of 73 yarns/2.54 cm for the warp and weft. Table 2 shows the operational information, physical properties, and appearance quality of the obtained fabric.

The obtained fabric had few weft insertion errors, excellent loom operation efficiency, and good appearance quality as a final product. Further, the fabric was lightweight and compact, but had sufficient strength characteristics and a high average edgecomb resistance retention in the warp and weft directions after heating; and was thus a fabric less susceptible to damage to seams. An airbag fabric with low residual shrinkage and ensured long-term dimensional and physical property stability was thus obtained.

Example 2

An original yarn was produced under the same conditions as in Example 1, except that the total fineness to be achieved was changed to 270 dtex, and the cold/hot draw ratio was adjusted to 2.2. Table 1 shows physical properties of the obtained original yarn.

A plain-weave fabric with a weave density of 69 yarns/2.54 cm for the warp and weft was obtained in the same manner as in Example 1, except that the obtained 270 dtex nylon 66 yarn was used for the warp and weft, the on-machine density was set to 64 yarns/2.54 cm for both the warp and weft, and the average warp tension was set to 0.23 cN/dtex. Table 2 shows the operational information, physical properties, and appearance quality of the obtained fabric.

The obtained fabric had few weft insertion errors, excellent loom operation efficiency, and good appearance quality as a final product. Further, the fabric was lightweight and compact, but had sufficient strength characteristics and a high average edgecomb resistance retention in the warp and weft directions after heating; and was thus a fabric less susceptible to damage to seams. An airbag fabric with low residual shrinkage and ensured long-term dimensional and physical property stability was thus obtained.

Example 3

A plain fabric was obtained in the same manner as in Example 2, except the average warp tension was adjusted to 0.23 cN/dtex and the loom rotation speed was set to 900 rpm. Table 2 shows the operational information, physical properties, and appearance quality of the obtained fabric.

The obtained fabric had acceptable levels of operation efficiency and appearance quality as a final product. Further, the fabric was lightweight and compact, but had sufficient strength characteristics and a high average edgecomb resistance retention in the warp and weft directions after heating; and was thus a fabric less susceptible to damage to seams.

An airbag fabric with low residual shrinkage and ensured long-term dimensional and physical property stability was thus obtained.

Example 4

An original yarn was produced under the same conditions as in Example 1, except that the total fineness to be achieved was changed to 310 dtex, the cold/hot draw ratio was adjusted to 2.2, and the total draw ratio was set to 5.1-fold. Table 1 shows physical properties of the obtained original yarn.

A plain weave fabric with a weave density of 63 yarns/2.54 cm for the warp and weft was obtained in the same manner as in Example 1, except that the obtained 310 dtex nylon 66 original yarn was used for the warp and weft, the on-machine density was set to 59 yarns/2.54 cm for both the warp and weft, and the average warp tension was set to 0.22 cN/dtex. Table 2 shows the operational information, physical properties, and appearance quality of the obtained fabric.

The obtained fabric had few weft insertion errors, excellent loom operation efficiency, and good appearance quality as a final product. Further, the fabric was lightweight and compact, but had sufficient strength characteristics and a high average edgecomb resistance retention in the warp and weft directions after heating; and was thus a fabric less susceptible to damage to seams. An airbag fabric with low residual shrinkage and ensured long-term dimensional and physical property stability was thus obtained.

Example 5

An original yarn was produced under the same conditions as in Example 1, except that nylon 66 polymer in the form of pellets having a relative viscosity RV to sulfuric acid of 3.5 was used, the target total fineness to be achieved was changed to 310 dtex, the cold/hot draw ratio was adjusted to 2.4, and the total draw ratio was set to 5.4-fold. Table 1 shows physical properties of the obtained original yarn.

Using the obtained 310 dtex nylon 66 yarn for the warp and weft, a plain weave fabric with a weave density of 63 yarns/inch for the warp and weft was obtained in the same manner as in Example 4. Table 2 shows the operational information, physical properties, and appearance quality of the obtained fabric.

The obtained fabric had few weft insertion errors, excellent loom operation efficiency, and good appearance quality as a final product. Further, the fabric was lightweight and compact, but had sufficient strength characteristics and a high average edgecomb resistance retention in the warp and weft directions after heating; and was thus a fabric less susceptible to damage to seams. An airbag fabric with low residual shrinkage and ensured long-term dimensional and physical property stability was thus obtained.

Example 6

An original yarn was produced under the same conditions as in Example 1, except that the target fineness to be achieved was changed to 350 dtex, and the total draw ratio was set to 5.1-fold. Table 1 shows physical properties of the obtained original yarn.

A plain weave fabric with a weave density of 58 yarns/2.54 cm for the warp and weft was obtained in the same manner as in Example 1 except that the obtained 350 dtex nylon 66 original yarn was used for the warp and weft, and the on-machine density was set to 54 yarns/2.54 cm for both the warp and weft. Table 2 shows the operational information, physical properties, and appearance quality of the obtained fabric.

The obtained fabric had few weft insertion errors, excellent loom operation, and good appearance quality as a final product. Further, the fabric was lightweight and compact, but had sufficient strength characteristics and a high average edgecomb resistance retention in the warp and weft directions after heating; and was thus a fabric less susceptible to damage to seams. An airbag fabric with low residual shrinkage and ensured long-term dimensional and physical property stability was thus obtained.

Example 7

An original yarn was produced under the same conditions as above, except that the total fineness to be achieved was changed to 350 dtex, the cold/hot draw ratio was adjusted to 2.7, the cold-drawing was performed at 60° C., and the hot-drawing was performed at 160° C. Table 1 shows physical properties of the obtained original yarn.

Using the obtained 350 dtex nylon 66 original yarn for the warp and weft, a plain weave fabric with a weave density of 58 yarns/2.54 cm for the warp and weft was obtained in the same manner as in Example 6. Table 2 shows the operational information, physical properties, and appearance quality of the obtained fabric.

The obtained fabric had few weft insertion errors, excellent loom operation efficiency, and good appearance quality as a final product. Further, the fabric was lightweight and compact, but had sufficient strength characteristics and a good average edgecomb resistance retention in the warp and weft directions after heating. An airbag fabric with an acceptable level of damage to seams was thus obtained.

Example 8

An original yarn was produced under the same conditions as in Example 1, except that the total fineness to be achieved was changed to 350 dtex, the cold/hot draw ratio was adjusted to 1.6, cold-drawing was performed at 70° C., hot-drawing was performed at 210° C., heat-setting was then performed at a temperature of 240° C., a 4% relaxation treatment was performed, and the total draw ratio was set to 4.9-fold. Table 1 shows physical properties of the obtained original yarn.

Using the obtained 350 dtex nylon 66 original yarn for the warp and weft, a plain weave fabric with a weave density of 58 yarns/2.54 cm for the warp and weft was obtained in the same manner as in Example 6. Table 2 shows the operational information, physical properties, and appearance.

The obtained fabric had acceptable levels of loom operation efficiency and appearance quality as a final product. Further, the fabric was lightweight and compact, but had sufficient strength characteristics and a good average edgecomb resistance retention after heating in the warp and weft directions. An airbag fabric with acceptable levels of damage to seams was thus obtained.

Example 9

An original yarn was produced under the same conditions as in Example 1, except that the total fineness to be achieved was changed to 350 dtex, the spun polymer was passed through a 150 mm heat-retention cylinder controlled at an ambient temperature of 240° C. to form yarn at a nozzle draft ratio of 110, and the cold/hot draw ratio was adjusted to 2.2. Table 1 shows physical properties of the obtained original yarn.

Using the obtained 350 dtex nylon 66 original yarn for the warp and weft, a plain weave fabric with a weave density of 58 yarns/2.54 cm for the warp and weft was obtained in the same manner as in Example 6. Table 2 shows the operational information, physical properties, and appearance.

The obtained fabric had acceptable levels of loom operation efficiency and appearance quality as a final product. Further, the fabric was lightweight and compact, but had sufficient strength characteristics and a good average edgecomb resistance retention in the warp and weft directions after heating. An airbag fabric with acceptable levels of damage to seams was thus obtained.

Example 10

An original yarn was produced under the same conditions as in Example 1, except that the total fineness to be achieved was changed to 350 dtex, the spun polymer was passed through a 500 mm heat-retention cylinder controlled at an ambient temperature of 280° C. and solidified by cooling with quenching air whose velocity distribution was controlled at 8%, and yarn was formed at a nozzle draft ratio of 180. Table 1 shows physical properties of the obtained original yarn.

Using the obtained 350 dtex nylon 66 original yarn for the warp and weft, a plain weave fabric with a weave density of 58 yarns/2.54 cm for the warp and weft was obtained in the same manner as in Example 6. Table 2 shows the operational information, physical properties, and appearance quality of the obtained fabric.

The obtained fabric had acceptable levels of loom operation efficiency and appearance quality as a final product. Further, the fabric was lightweight and compact, but had sufficient strength characteristics and a good average edgecomb resistance retention in the warp and weft directions after heating. An airbag fabric with acceptable levels of damage to seams was thus obtained.

Example 11

An airbag fabric was obtained by producing yarn and weaving in the same manner as in Example 1. Further, a solvent-free silicone resin was applied to one side of the obtained airbag fabric by knife-on-air coating with a knife having an edge of a semicircular shape with an edge radius R of 0.3 mm at a fabric tension in the length direction during coating of 0.09 cN/dtex. The coating was cured at 180° C. for 1 minute to obtain a coated fabric having a coating amount of 21 g/m$^2$. The properties of the obtained coated base fabric were evaluated and shown in Table 3.

The obtained coated fabric was lightweight and compact, but had sufficient strength characteristics and a high average edgecomb resistance retention in the warp and weft directions after heating; and was thus a fabric less susceptible to damage to seams. A coated fabric for airbags with low residual shrinkage and ensured long-term dimensional and physical property stability was thus obtained.

Example 12

An airbag fabric was obtained by producing yarn and weaving in the same manner as in Example 4. A solvent-free silicone resin was applied to one side of the obtained airbag fabric by knife-on-air coating with a knife having an edge of a semicircular shape with an edge radius R of 0.3 mm under a fabric tension in the length direction during coating of 0.08 cN/dtex. The coating was cured at 180° C. for 1 minute to obtain a coated fabric having a coating amount of 20 g/m². The properties of the obtained coated base fabric were evaluated and shown in Table 3.

The obtained coated fabric was lightweight and compact, but had sufficient strength characteristics and a high average edgecomb resistance retention in the warp and weft directions after heating; and was thus a fabric less susceptible to damage to seams. A coated fabric for airbags with low residual shrinkage and ensured long-term dimensional and physical property stability was thus obtained.

Example 13

An airbag fabric was obtained by producing yarn and weaving in the same manner as in Example 6. A solvent-free silicone resin was applied to one side of the obtained airbag fabric by knife-on-air coating with a knife having an edge of a semicircular shape with an edge radius R of 0.4 mm at a fabric tension in the length direction during coating of 0.08 cN/dtex. The coating was cured at 180° C. for 1 minute to obtain a coated fabric having a coating amount of 25 g/m². The properties of the obtained coated base fabric were evaluated and shown in Table 3.

The obtained coated fabric was lightweight and compact, but had sufficient strength characteristics and a high average edgecomb resistance retention in the warp and weft directions after heating; and was thus a fabric less susceptible to damage to seams. A coated fabric for airbags with low residual shrinkage and ensured long-term dimensional and physical property stability was thus obtained.

Example 14

An airbag fabric was obtained by producing yarn and weaving in the same manner as in Example 6. An aqueous dispersion of polyamide resin was applied to one side of the obtained airbag fabric by knife-on-air coating with a knife having an edge of a semicircular shape with an edge radius R of 0.3 mm under a fabric tension in the length direction during coating of 0.09 cN/dtex. The coating was cured at 180° C. for 1 minute to obtain a coated fabric having a coating amount of 7 g/m². The properties of the obtained coated fabric were evaluated and shown in Table 3.

The obtained coated fabric was lightweight and compact, but had sufficient strength characteristics and a high average edgecomb resistance retention in the warp and weft directions after heating; and was thus a fabric less susceptible to damage to seams. A coated fabric for airbags with low residual shrinkage and ensured long-term dimensional and physical property stability was thus obtained.

Comparative Example 1

A nylon 66 polymer in the foil of pellets having a relative viscosity RV to sulfonic acid of 3.2 was melted at a temperature of 300° C. using an extruder; homogenized to a temperature of 295° C. using a spin head; and metered with a gear pump so that yarn after winding had a total fineness of 235 dtex; and spun through a spinneret pack. The spun yarn passed through a 300 mm heat-retention cylinder whose atmospheric temperature was controlled at 260° C., and was solidified by cooling with quenching air whose velocity distribution was controlled at 6% to form a yarn at a nozzle draft ratio of 150. After an oil agent was applied to the solidified yarn by a known method, the yarn was taken up by a feed roller without being wound once. The obtained yarn was subjected to cold-drawing at 50° C. and hot-drawing at 180° C. at a cold/hot draw ratio of 1.8. The drawn yarn was heat-set at a temperature of 230° C., subjected to a 5% relaxation treatment, appropriately entangled using a known entanglement device, and then wound up using a wind-up machine. The total draw ratio at that time was 4.7-fold. Table 4 shows physical properties of the obtained original yarn.

Using the obtained 235 dtex nylon 66 original yarn for the warp and weft, and using a Tsudakoma water-jet loom (ZW8100), a fabric was woven at an on-machine density of 68 yarns/2.54 cm for both the warp and weft, at a loom rotation speed of 700 rpm, and under a warp average tension of 0.25 cN/dtex. The obtained fabric was passed through a 98° C. hot-water bath to perform a hot-water shrinkage treatment while adjusting the processing tension to a traveling tension of 0.026 cN/dtex in the warp direction. Subsequently, the fabric was subjected to drying under a traveling tension of 0.026 cN/dtex in the warp direction to obtain a plain weave fabric with a warp and weft weave density of 73 yarns/2.54 cm. Table 5 shows the operational information, physical properties, and appearance quality of the obtained fabric.

The obtained fabric had few weft insertion errors, but had insufficient strength characteristics, and fibers constituting the fabric also had insufficient thermal stress; therefore, the fabric had a low average edgecomb resistance retention in the warp and weft directions after heating, and was thus a fabric susceptible to damage to seams.

Comparative Example 2

An original yarn was produced under the same conditions as in Comparative Example 1, except that the total fineness to be achieved was 350 dtex. Table 4 shows physical properties of the obtained original yarn.

A plain weave fabric having a weave density of 58 yarns/inch for the warp and weft was obtained in the same manner as in Comparative Example 1, except that the obtained 350 dtex nylon 66 yarn was used for the warp and weft, and the on-machine density was set to 54 yarns/2.54 cm for both the warp and weft. Table 5 shows the operational information, physical properties, and appearance quality of the obtained fabric.

The obtained fabric was lightweight and compact, but fibers constituting the fabric had insufficient thermal stress; therefore, the fabric had a low average edgecomb resistance retention in the warp and weft directions after heating, and was thus a fabric susceptible to damage to seams.

Comparative Example 3

Using the 350 dtex nylon 66 original yarn of Comparative Example 2 for the warp and weft, and using a Tsudakoma water-jet loom (ZW8100), a fabric was woven at an on-machine density of 55.5/2.54 cm for both the warp and weft, at a loom rotation speed of 700 rpm, and under an average warp tension of 0.27 cN/dtex. The obtained fabric was passed through a 70° C. hot-water bath, and subjected to shrinkage processing using boiling water while adjusting the processing tension to a traveling tension in the warp direction of 0.026 cN/dtex. Subsequently, a drying treatment was performed under a traveling tension in the warp direction of 0.026 cN/dtex to obtain a plain weave fabric having a weave density of 58 yarns/2.54 cm for the warp and weft. Table 5 shows the operational information, physical properties, and appearance quality of the obtained fabric.

Since the obtained fabric was subjected to shrinkage processing under mild conditions so as to retain a high thermal stress of fiber constituting the fabric, damage to seams was at an acceptable level. However, since the residual shrinkage percentage is high, concerns remained about long-term dimensional and physical stability of the obtained fabric.

Comparative Example 4

An original yarn was produced under the same conditions as in Comparative Example 1, except that the total fineness to be achieved was 470 dtex. Table 4 shows physical properties of the obtained original yarn.

A plain weave fabric with a weave density of 54 yarns/2.54 cm for the warp and weft was obtained in the same manner as in Comparative Example 1, except that the obtained 470 dtex nylon 66 original yarn was used for the warp and weft, and the on-machine density was set to 50 yarns/2.54 cm for both the warp and weft. Table 5 shows operational information, physical properties, and appearance quality of the obtained fabric.

Since fibers constituting the fabric had insufficient thermal stress, the obtained fabric had a low average edgecomb resistance retention in the warp and weft directions after heating, and was thus a fabric susceptible to damage to seams. Further, the fabric has a thick fineness, and was unsuitable for achieving light weight and compactness.

Comparative Example 5

An original yarn was produced in the same manner as in Comparative Example 1, except that the total fineness to be achieved was 270 dtex, a 50 mm heat-retention cylinder was used, the cold/hot draw ratio was adjusted to 2.0, heat-setting was then performed at 230° C., 7% relaxation treatment was performed, and the total draw ratio was 5.2-fold. Table 4 shows the physical properties of the obtained original yarn.

Using the 270 dtex nylon 66 original yarn for the warp and weft, and using a Tsudakoma water-jet loom (ZW8100), a fabric was woven at an on-machine density of 68.5/2.54 cm for both the warp and weft, at a loom rotation speed of 700 rpm, and under an average warp tension of 0.35 cN/dtex. The obtained fabric was subjected to scouring processing in a hot-water bath of 50° C., and then dried at 110° C. for 1 minute. Subsequently, using a pin tenter, the fabric was subjected to heating at 180° C. for 30 seconds, without overfeeding in the fabric-traveling direction and width direction. A plain weave fabric with a weave density of 69 yarns/2.54 cm for the warp and weft was obtained. Table 5 shows operational information, physical properties, and appearance quality of the obtained fabric.

Since the fabric was not subjected to boiling-water shrinkage processing in post-processing, it was necessary to weave the fabric at a high on-loom density. Due to the application of high tension, warp fuzz easily occurs, thus resulting in poor loom operation efficiency. Furthermore, the obtained fabric had poor appearance quality as a final product, and was also confirmed to have reduced fabric strength in the warp direction.

Comparative Example 6

A solvent-free silicone resin was applied to one side of the airbag fabric obtained in Comparative Example 3 by knife-on-air coating with a knife having an edge of a semicircular shape with an edge radius R of 0.4 mm at a fabric tension in the length direction during coating of 0.08 cN/dtex. The coating was cured at 180° C. for 1 minute to obtain a coated fabric having a coating amount of 25 g/m². The properties of the obtained coated base fabric were evaluated and shown in Table 5.

The obtained coated fabric had reduced residual shrinkage due to heating during coating, and thereby had improved long-term dimensional and physical stability; however, the fabric had a low average edgecomb resistance retention in the warp and weft directions after heating, and was thus a fabric susceptible to damage to seams.

TABLE 1

| | | Unit | Examples 1 and 11 | Examples 2 and 3 | Examples 4 and 12 | Example 5 | Examples 6 13, and 14 | Example 7 | Example 8 | Example 9 | Example 10 |
|---|---|---|---|---|---|---|---|---|---|---|---|
| Production of original yarn production | Relative viscosity to sulfuric acid | — | 3.2 | 3.2 | 3.2 | 3.5 | 3.2 | 3.2 | 3.2 | 3.2 | 3.2 |
| | Heating cylinder length | mm | 300 | 300 | 300 | 300 | 300 | 300 | 300 | 150 | 500 |
| | Atmospheric temperature in heating cylinder | °C. | 260 | 260 | 260 | 260 | 260 | 260 | 260 | 240 | 280 |
| | The velocity of cooling air | m/s | 0.4 | 0.4 | 0.4 | 0.4 | 0.4 | 0.4 | 0.4 | 0.3 | 0.8 |
| | Cooling-air velocity distribution | % | 6 | 6 | 6 | 6 | 6 | 6 | 6 | 6 | 8 |
| | Spinning-nozzle draft | — | 150 | 150 | 150 | 150 | 150 | 150 | 150 | 110 | 180 |
| | Cold/hot draw ratio | — | 2.0 | 2.2 | 2.2 | 2.4 | 2.0 | 2.7 | 1.6 | 2.2 | 2.0 |
| | Heat-setting temperature | °C. | 230 | 230 | 230 | 230 | 230 | 210 | 240 | 230 | 230 |
| | Relaxation ratio | % | 3 | 3 | 3 | 3 | 3 | 2 | 4 | 3 | 3 |
| | Total draw ratio | Fold | 5.2 | 5.2 | 5.1 | 5.4 | 5.1 | 4.8 | 4.9 | 5.2 | 5.2 |
| Physical properties and appearance quality of original yarn | Total fineness | dtex | 235 | 270 | 310 | 310 | 350 | 350 | 350 | 350 | 350 |
| | Number of filaments | Yarns | 72 | 84 | 96 | 96 | 108 | 108 | 108 | 108 | 108 |
| | Fineness of single filament | dtex | 3.3 | 3.2 | 3.2 | 3.2 | 3.2 | 3.2 | 3.2 | 3.2 | 3.2 |
| | Tensile strength | cN/dtex | 9.7 | 9.4 | 9.3 | 10.1 | 9.2 | 9.0 | 9.0 | 9.1 | 9.1 |
| | Tensile elongation | % | 18 | 18 | 18 | 19 | 19 | 19 | 19 | 18 | 18 |
| | Single filament cross-section diameter | % | 12 | 10 | 12 | 12 | 13 | 14 | 14 | 17 | 19 |
| | Shrinkage with boiling water | % | 9.0 | 8.9 | 9.1 | 9.2 | 8.9 | 10.5 | 8.6 | 9.0 | 9.0 |

TABLE 2

| | | Unit | Example 1 | Example 2 | Example 3 | Example 4 | Example 5 |
|---|---|---|---|---|---|---|---|
| Weaving | Weave density (warp/weft) | Yarns/2.54 cm | 68/68 | 64/64 | 64/64 | 59/59 | 59/59 |
| | Warp tension | cN/dtex | 0.25 | 0.23 | 0.25 | 0.22 | 0.22 |
| | Loom rotation speed | rpm | 700 | 700 | 900 | 700 | 700 |
| | Number of loom stops due to weft insertion error | Times/hr | 0.45 | 0.4 | 1.0 | 0.35 | 0.3 |
| | Loom operation efficiency | — | ○ | ○ | Δ | ○ | ○ |
| Processing | | — | Shrinking using boiling water | Shrinking using boiling water | Shrinking using boiling water | Shrinking using boiling water | Shrinking using boiling water |
| Fabric properties | Weave density (warp/weft) | Yarns/2.54 cm | 73/73 | 69/69 | 69/69 | 63/63 | 63/63 |
| | Cover factor | — | 2123 | 2151 | 2151 | 2105 | 2105 |
| | Mass per unit area | g/m² | 149 | 161 | 150 | 170 | 170 |
| | Thickness | mm | 0.22 | 0.23 | 0.23 | 0.25 | 0.25 |
| | Tensile strength (warp/weft) | N/cm | 555/560 | 625/650 | 630/650 | 645/680 | 695/720 |
| | Tensile elongation (warp/weft) | % | 31/27 | 34/25 | 33/26 | 34/28 | 34/28 |
| | Average edgecomb resistance before heating (warp direction/weft direction) | N | 630/600 | 620/540 | 600/550 | 750/610 | 760/720 |
| | Average edgecomb resistance in the warp and weft directions before heating | N | 615 | 580 | 575 | 680 | 740 |
| | Average edgecomb resistance after heating (warp direction/weft direction) | N | 510/430 | 505/435 | 480/450 | 540/480 | 580/540 |
| | Average edgecomb resistance in the warp and weft directions after heating | N | 470 | 470 | 465 | 510 | 560 |
| | An average edgecomb resistance retention in the warp and weft directions after heating | % | 76 | 81 | 81 | 75 | 75 |
| | Coefficient of compactness test | mm² | 8100 | 8850 | 8850 | 9550 | 9550 |
| | Residual shrinkage (warp/weft) | % | 1.0/0.5 | 0.8/0.5 | 0.8/0.5 | 1.0/0.3 | 1.0/0.3 |
| Properties of fibrillated yarn | Total fineness of fibrillated yarn | dtex | 244 | 281 | 281 | 322 | 321 |
| | Fineness of single filament of fibrillated yarn | dtex | 3.4 | 3.3 | 3.3 | 3.4 | 3.4 |
| | Tensile strength of fibrillated yarn (warp/weft) | cN/dtex | 8.5/8.3 | 8.5/8.2 | 8.5/8.2 | 8.3/8.2 | 8.5/8.6 |
| | Tensile elongation of fibrillated yarn (warp/weft) | % | 27/23 | 22/21 | 22/21 | 28/24 | 29/25 |

TABLE 2-continued

|  |  | Unit | | | | | |
|---|---|---|---|---|---|---|---|
|  | Thermal stress of fibrillated yarn (warp/weft) | cN/dtex | 0.66/0.66 | 0.66/0.65 | 0.66/0.65 | 0.66/0.65 | 0.66/0.66 |
| Appearance quality | Number of fuzz defects | Defects/100 m | 0.5 | 0.6 | 1.2 | 0.5 | 0.4 |
| Coating | Coating agent | — | — | — | — | — | — |
|  | Base fabric tension during coating | cN/dtex | — | — | — | — | — |
|  | Coating amount | g/m² | — | — | — | — | — |
| Bag evaluation | Damage to seams in deployment test | — | ◯ | ◯ | ◯ | ◯ | ◯ |

|  |  | Unit | Example 6 | Example 7 | Example 8 | Example 9 | Example 10 |
|---|---|---|---|---|---|---|---|
| Weaving | Weave density (warp/weft) | Yarns/2.54 cm | 54/54 | 54/54 | 54/54 | 54/54 | 54/54 |
|  | Warp tension | cN/dtex | 0.25 | 0.25 | 0.25 | 0.25 | 0.25 |
|  | Loom rotation speed | rpm | 700 | 700 | 700 | 700 | 700 |
|  | Number of loom stops due to weft insertion error | Times/hr | 0.35 | 1.6 | 1.2 | 1.1 | 1.2 |
|  | Loom operation efficiency | — | ◯ | Δ | Δ | Δ | Δ |
| Processing |  | — | Shrinking using boiling water | Shrinking using boiling water | Shrinking using boiling water | Shrinking using boiling water | Shrinking using boiling water |
| Fabric properties | Weave density (warp/weft) | Yarns/2.54 cm | 58/58 | 58/58 | 58/58 | 58/58 | 58/58 |
|  | Cover factor | — | 2059 | 2059 | 2059 | 2059 | 2059 |
|  | Mass per unit area | g/m² | 171 | 172 | 171 | 171 | 171 |
|  | Thickness | mm | 0.25 | 0.25 | 0.25 | 0.25 | 0.25 |
|  | Tensile strength (warp/weft) | N/cm | 655/680 | 640/670 | 640/650 | 650/655 | 650/660 |
|  | Tensile elongation (warp/weft) | % | 29/24 | 28/24 | 28/25 | 29/24 | 29/24 |
|  | Average edgecomb resistance before heating (warp direction/weft direction) | N | 500/460 | 550/490 | 535/485 | 520/420 | 550/510 |
|  | Average edgecomb resistance in the warp and weft directions before heating | N | 480 | 520 | 510 | 470 | 530 |
|  | Average edgecomb resistance after heating (warp direction/weft direction) | N | 370/310 | 360/330 | 315/305 | 360/320 | 375/345 |
|  | Average edgecomb resistance in the warp and weft directions after heating | N | 340 | 345 | 310 | 340 | 360 |
|  | An average edgecomb resistance retention in the warp and weft directions after heating | % | 71 | 65 | 61 | 72 | 68 |

TABLE 2-continued

|  |  |  |  |  |  |  |  |
|---|---|---|---|---|---|---|---|
|  | Coefficient of compactness test | mm² | 9700 | 9500 | 9450 | 9750 | 9400 |
|  | Residual shrinkage (warp/weft) | % | 0.9/0.3 | 1.4/0.5 | 0.8/0.5 | 1.1/0.3 | 1.0/0.3 |
| Properties of fibrillated yarn | Total fineness of fibrillated yarn | dtex | 364 | 368 | 363 | 362 | 361 |
|  | Fineness of single filament of fibrillated yarn | dtex | 3.4 | 3.4 | 3.4 | 3.4 | 3.4 |
|  | Tensile strength of fibrillated yarn (warp/weft) | cN/dtex | 8.6/8.7 | 7.7/7.9 | 8.1/8.3 | 8.2/8.1 | 8.3/8.2 |
|  | Tensile elongation of fibrillated yarn (warp/weft) | % | 22/21 | 25/23 | 24/21 | 23/21 | 24/23 |
|  | Thermal stress of fibrillated yarn (warp/weft) | cN/dtex | 0.67/0.65 | 0.63/0.61 | 0.62/0.60 | 0.65/0.60 | 0.62/0.61 |
| Appearance quality | Number of fuzz defects | Defects/100 m | 0.5 | 2.6 | 2.1 | 2.2 | 1.3 |
| Coating | Coating agent | — | — | — | — | — | — |
|  | Base fabric tension during coating | cN/dtex | — | — | — | — | — |
|  | Coating amount | g/m² | — | — | — | — | — |
| Bag evaluation | Damage to seams in deployment test | — | ○ | Δ | Δ | Δ | Δ |

TABLE 3

|  |  | Unit | Example 11 | Example 12 | Example 13 | Example 14 |
|---|---|---|---|---|---|---|
| Weaving | Weave density (warp/weft) | Yarns/2.54 cm | 58/68 | 59/59 | 54/54 | 54/54 |
|  | Warp tension | cN/ctex | 0.25 | 0.22 | 0.25 | 0.25 |
|  | Loom rotation speed | rpm | 700 | 700 | 700 | 700 |
|  | Number of loom stops due to weft insertion error | Times/hr | 0.45 | 0.35 | 0.35 | 0.35 |
|  | Loom operation efficiency | — | ○ | ○ | ○ | ○ |
| Processing |  | — | Shrinking using boiling water | Shrinking using boiling water | Shrinking using boiling water | Shrinking using boiling water |
| Fabric properties | Weave density (warp/weft) | Yarns/2.54 cm | 74/72 | 64/63 | 59/58 | 59/58 |
|  | Cover factor | — | 2123 | 2121 | 2077 | 2077 |
|  | Mass per unit area | g/m² | 170 | 190 | 196 | 178 |
|  | Thickness | mm | 0.22 | 0.25 | 0.26 | 0.25 |
|  | Tensile strength (warp/weft) | N/cm | 580/555 | 660/670 | 670/650 | 640/670 |
|  | Tensile elongation (warp/weft) | % | 32/27 | 34/28 | 30/24 | 35/26 |
|  | Average edgecomb resistance before heating (warp direction/weft direction) | N | 670/530 | 710/630 | 470/470 | 670/540 |
|  | Average edgecomb resistance in the warp and weft directions before heating | N | 550 | 670 | 470 | 605 |

TABLE 3-continued

|  |  | Unit | Example 11 | Example 12 | Example 13 | Example 14 |
|---|---|---|---|---|---|---|
|  | Average edgecomb resistance after heating (warp direction/weft direction) | N | 420/400 | 525/495 | 360/340 | 460/400 |
|  | Average edgecomb resistance in the warp and weft directions after heating | N | 410 | 510 | 350 | 430 |
|  | An average edgecomb resistance retention in the warp and weft directions after heating | % | 75 | 76 | 74 | 71 |
|  | Coefficient of compactness test | mm³ | 8300 | 9700 | 9500 | 9750 |
|  | Residual shrinkage (warp/weft) | % | 0.5/0.3 | 0.5/0.3 | 0.6/0.3 | 0.6/0.3 |
| Properties of fibrillated yarn | Total fineness of fibrillated yarn | dtex | 244 | 322 | 364 | 361 |
|  | Fineness of single filament of fibrillated yarn | dtex | 3.4 | 3.4 | 3.4 | 3.4 |
|  | Tensile strength of fibrillated yarn (warp/weft) | cN/ctex | 8.4/8.3 | 8.3/8.2 | 8.5/8.5 | 8.3/8.2 |
|  | Tensile elongation of fibrillated yarn (warp/weft) | % | 28/23 | 29/24 | 23/22 | 29/24 |
|  | Thermal stress of fibrillated yarn (warp/weft) | cN/ctex | 0.66/0.66 | 0.67/0.65 | 0.66/0.65 | 0.67/0.65 |
| Appearance quality | Number of fuzz defects | Defects/100 m | — | — | — | — |
| Coating | Coating agent | — | Solvent-free silicone | Solvent-free silicone | Solvent-free silicone | Aqueous dispersion of polyamide |
|  | Base fabric tension during coating | cN/ctex | 0.09 | 0.08 | 0.08 | 0.08 |
|  | Coating amount | g/m³ | 21 | 20 | 25 | 7 |
| Bag evaluation | Damage to seams in deployment test | — | ○ | ○ | ○ | ○ |

TABLE 4

|  |  | Unit | Comparative Example 1 | Comparative Example 2, 3 and 6 | Comparative Example 4 | Comparative Example 5 |
|---|---|---|---|---|---|---|
| Production of original yarn production | Relative viscosity to sulfuric acid | — | 3.2 | 3.2 | 3.2 | 3.2 |
|  | Heating cylinder length | mm | 300 | 300 | 300 | 50 |
|  | Atmospheric temperature in heating cylinder | °C. | 260 | 260 | 260 | 260 |
|  | The velocity of cooling air | m/s | 0.4 | 0.4 | 0.4 | 0.3 |
|  | Cooling-air velocity distribution | % | 6 | 6 | 6 | 6 |
|  | Spinning-nozzle draft | — | 150 | 150 | 150 | 150 |
|  | Cold/hot draw ratio | — | 1.8 | 1.8 | 2.2 | 2.0 |
|  | Heat-setting temperature | °C. | 205 | 205 | 205 | 230 |
|  | Relaxation ratio | % | 5 | 5 | 5 | 7 |
|  | Total draw ratio | Fold | 4.7 | 4.7 | 4.7 | 5.2 |
| Physical properties and appearance quality of | Total fitness | dtex | 235 | 350 | 470 | 270 |
|  | Number of filaments | Yarns | 72 | 108 | 72 | 84 |
|  | Fineness of single filament | dtex | 3.2 | 3.2 | 6.5 | 3.2 |
|  | Tensile strength | cN/dtex | 8.5 | 8.5 | 8.5 | 9.4 |

TABLE 4-continued

|  |  | Unit | Comparative Example 1 | Comparative Example 2, 3 and 6 | Comparative Example 4 | Comparative Example 5 |
|---|---|---|---|---|---|---|
| original yarn | Tensile elongation | % | 21 | 21 | 24 | 19 |
|  | Single filament cross-section diameter | % | 11 | 13 | 11 | 11 |
|  | Shrinkage with boiling water | % | 9.1 | 9.1 | 9.2 | 4.9 |

TABLE 5

|  |  | Unit | Comparative Example 1 | Comparative Example 2 | Comparative Example 3 | Comparative Example 4 | Comparative Example 5 | Comparative Example 6 |
|---|---|---|---|---|---|---|---|---|
| Weaving | Weave density (warp/weft) | Yarns/2.54 cm | 68/68 | 54/54 | 55.5/55.5 | 50/50 | 68.5/68.5 | 55.5/55.5 |
|  | Warp tension | cN/dtex | 0.25 | 0.25 | 0.27 | 0.25 | 0.35 | 0.27 |
|  | Loom rotation speed | rpm | 700 | 700 | 700 | 700 | 700 | 700 |
|  | Number of loom stops due to weft insertion error | Times/hr | 0.4 | 0.4 | 0.45 | 0.45 | 15 | 0.45 |
|  | Loom operation efficiency | — | ○ | ○ | ○ | ○ | X | ○ |
| Processing |  | — | Shrinkage using boiling water | Shrinkage using boiling water | Shrinkage using boiling water | Shrinkage using boiling water | Heat-setting | Mild conditions |
| Fabric properties | Weave density (warp/weft) | Yarns/2.54 cm | 73/73 | 58/58 | 58/58 | 54/54 | 69/69 | 59/58 |
|  | Cover factor | — | 2123 | 2059 | 2059 | 2221 | 2151 | 2077 |
|  | Mass per unit area | g/m$^2$ | 145 | 173 | 173 | 221 | 165 | 198 |
|  | Thickness | mm | 0.21 | 0.25 | 0.26 | 0.32 | 0.24 | 0.26 |
|  | Tensile strength (warp/weft) | N/cm | 495/500 | 600/640 | 645/655 | 745/790 | 630/640 | 640/650 |
|  | Tensile elongation (warp/weft) | % | 34/29 | 32/28 | 29/25 | 35/29 | 33/25 | 28/24 |
|  | Average edgecomb resistance before heating (warp direction/weft direction) | N | 635/565 | 480/420 | 470/420 | 605/555 | 590/550 | 450/480 |
|  | Average edgecomb resistance in the warp and weft directions before heating | N | 600 | 450 | 445 | 580 | 570 | 455 |
|  | Average edgecomb resistance after heating (warp direction/weft direction) | N | 380/330 | 285/235 | 290/270 | 350/320 | 490/420 | 240/280 |
|  | Average edgecomb resistance in the warp and weft directions after heating | N | 355 | 260 | 280 | 335 | 455 | 260 |
|  | An average edgecomb resistance retention in the warp and weft directions after heating | % | 59 | 58 | 63 | 58 | 80 | 56 |
|  | Coefficient of compactness test | mm$^2$ | 7900 | 9765 | 9845 | 12000 | 8855 | 9800 |
|  | Residual shrinkage (warp/weft) | % | 1.0/0.3 | 0.9/0.3 | 3.0/1.7 | 0.8/0.3 | 2.0/1.0 | 1.0/0.8 |
| Properties of fibrillated yarn | Total fineness of fibrillated yarn | dtex | 244 | 354 | 363 | 489 | 273 | 363 |
|  | Fineness of single filament of fibrillated yarn | dtex | 3.4 | 3.4 | 3.4 | 6.8 | 3.2 | 3.4 |
|  | Tensile strength of fibrillated yarn (warp/weft) | cN/dtex | 7.3/7.4 | 7.4/7.4 | 8.7/8.8 | 7.4/7.4 | 8.5/8.5 | 8.2/8.3 |

TABLE 5-continued

| | | Unit | Comparative Example 1 | Comparative Example 2 | Comparative Example 3 | Comparative Example 4 | Comparative Example 5 | Comparative Example 6 |
|---|---|---|---|---|---|---|---|---|
| | Tensile elongation of fibrillated yarn (warp/weft) | % | 30/26 | 25/23 | 21/20 | 29/25 | 22/22 | 23/22 |
| | Thermal stress of fibrillated yarn (warp/weft) | cN/dtex | 0.56/0.56 | 0.56/0.55 | 0.65/0.63 | 0.56/0.55 | 0.74/0.74 | 0.50/0.51 |
| Appearance quality | Number of fuzz defects | Defects/100 m | 0.6 | 0.5 | 0.9 | 0.4 | 5.2 | — |
| Coating | Coating agent | — | — | — | — | — | — | Solvent-free silicone |
| | Base fabric tension during coating | cN/dtex | — | — | — | — | — | 0.08 |
| | Coating amount | g/m² | — | — | — | — | — | 25 |
| Bag evaluation | Damage to seams in deployment test | — | X | X | Δ | X | ○ | X |

INDUSTRIAL APPLICABILITY

The airbag fabric and coated fabric for airbags of the present invention are lightweight and compact, and have tensile strength required for airbags; can mitigate damage to seams of airbags; and allow for stable airbag deployment, thus making significant contribution to industry.

DESCRIPTION OF REFERENCE NUMERALS

1: Nozzle
2: Heating cylinder
3: Cooling cylinder
4: Melt-spun yarn
5: Oil agent application device
6: Feed roller
7: First draw roll
8: Second draw roll
9: Heat-setting roll
10: Relaxation roll
11: Entangling device
12: Winder

The invention claimed is:

1. An airbag fabric comprising a synthetic fiber, the fiber having a total fineness of 200 to 400 dtex, and the fabric having an average edgecomb resistance retention in the warp and weft directions after heating at 210° C. for 30 seconds of 60% or more and a residual shrinkage of 1.5% or less in both the warp and weft directions.

2. The airbag fabric according to claim 1, wherein the fiber has a tensile strength of 7.5 to 9.3 cN/dtex.

3. The airbag fabric according to claim 1, wherein the fabric has a mass per unit area of 210 g/m² or less, a thickness of 0.3 mm or less, and a tensile strength of 550 N/cm or more.

4. The airbag fabric according to claim 1, wherein the synthetic fiber comprises a polyamide multifilament comprising a polyamide resin having a relative polymer viscosity to sulfuric acid of 3.0 to 3.5, the multifilament having a tensile strength of 9.0 cN/dtex or more, a tensile elongation of less than 20%, a total fineness of 400 dtex or less, a fineness of single filament of 2 to 7 dtex, a boiling-water shrinkage of 7 to 12%, and a coefficient of variation CV % of single filament cross-sectional diameter of 20% or less.

5. The airbag fabric according to claim 1, which is produced by, after weaving gray fabric, subjecting the gray fabric to a hot-water shrinkage step using hot water of 80° C. or higher, and to a dry-finishing step.

6. An airbag comprising the airbag fabric according to claim 1.

7. A coated fabric for airbags, comprising a fabric comprising a synthetic fiber and a coating supported by the fabric, the coated fabric having a coefficient of compactness test of 8000 to 11000 mm³, an average edgecomb resistance retention in the warp and weft directions after heating at 210° C. for 30 seconds of 60% or more, and a residual shrinkage of 1.5% or less in both the warp and weft directions.

8. The coated fabric for airbags according to claim 7, wherein the coated fabric has a thickness of 0.3 mm or less, and a tensile strength of 550 N/cm or more.

9. The coated fabric for airbags according to claim 7, wherein the coating comprises a solvent-free silicone as a coating resin.

10. An airbag comprising the coated fabric for airbags according to claim 7.

* * * * *